(12) United States Patent
Edelstein

(10) Patent No.: US 9,189,067 B2
(45) Date of Patent: *Nov. 17, 2015

(54) MEDIA DISTRIBUTION SYSTEM

(71) Applicant: Neal Joseph Edelstein, Los Angeles, CA (US)

(72) Inventor: Neal Joseph Edelstein, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/949,169

(22) Filed: Jul. 23, 2013

(65) Prior Publication Data

US 2014/0198027 A1    Jul. 17, 2014

Related U.S. Application Data

(63) Continuation-in-part of application No. 13/773,464, filed on Feb. 21, 2013, now Pat. No. 8,520,018.

(60) Provisional application No. 61/751,823, filed on Jan. 12, 2012, provisional application No. 61/767,168, filed on Feb. 20, 2013.

(51) Int. Cl.
*G09G 5/12* (2006.01)
*G06F 3/01* (2006.01)
*G06F 21/00* (2013.01)
*G06F 21/62* (2013.01)

(52) U.S. Cl.
CPC ............... *G06F 3/016* (2013.01); *G06F 21/00* (2013.01); *G06F 21/629* (2013.01)

(58) Field of Classification Search
CPC ........................................................ G06F 3/017
USPC .......................................................... 345/156
See application file for complete search history.

(56) References Cited

U.S. PATENT DOCUMENTS

| | | | |
|---|---|---|---|
| 5,067,164 A | 11/1991 | Denker et al. | |
| 5,572,628 A | 11/1996 | Denker et al. | |
| 6,496,803 B1 | 12/2002 | Seet et al. | |
| 6,763,226 B1 | 7/2004 | McZeal, Jr. | |
| 8,176,334 B2 | 5/2012 | Vainstein | |
| 8,560,391 B1 | 10/2013 | Shaw et al. | |
| 2002/0023094 A1 | 2/2002 | Kohda et al. | |
| 2003/0099461 A1 | 5/2003 | Johnson | |
| 2004/0009763 A1 | 1/2004 | Stone et al. | |
| 2004/0125877 A1 | 7/2004 | Chang et al. | |
| 2004/0130142 A1 | 7/2004 | Sarbaz et al. | |

(Continued)

OTHER PUBLICATIONS

Notice of Allowance for U.S. Appl. No. 13/733,464 mailed Jun. 21, 2013.

*Primary Examiner* — Javid A Amini
(74) *Attorney, Agent, or Firm* — Brooks Acordia IP Law, PC; Pejman Yedidsion; Gentle Winter

(57) ABSTRACT

Systems, devices, and methods for delivering and managing media whereby a first media element contains multiple media components and a combination of user activity and time are necessary to unlock a subset of the multiple media components. In one embodiment, the user activities include serving as a peer leader, purchasing a key that unlocks at least one of the multiple media components, and other activities having value to the system. The system may also update the media components individually, or in parallel. In addition, the requirements for unlocking one or more of the media components may vary dynamically, or the media components may vary based on: known individual characteristics of a user in a group of users, group characteristics of a subset of users within a group of users or other criteria.

19 Claims, 16 Drawing Sheets

(56) References Cited

U.S. PATENT DOCUMENTS

| | | |
|---|---|---|
| 2004/0140995 A1 | 7/2004 | Goldthwaite et al. |
| 2005/0015815 A1 | 1/2005 | Shoff et al. |
| 2005/0169468 A1 | 8/2005 | Fahrny et al. |
| 2005/0212755 A1* | 9/2005 | Marvit .......................... 345/156 |
| 2006/0114787 A1 | 6/2006 | Festal et al. |
| 2006/0190401 A1 | 8/2006 | Akadiri |
| 2007/0036395 A1 | 2/2007 | Okun |
| 2007/0126696 A1* | 6/2007 | Boillot .......................... 345/156 |
| 2008/0071834 A1 | 3/2008 | Bishop |
| 2008/0148096 A1 | 6/2008 | Zarnke et al. |
| 2008/0195938 A1 | 8/2008 | Tischer et al. |
| 2008/0252595 A1* | 10/2008 | Boillot .......................... 345/156 |
| 2008/0278598 A1 | 11/2008 | Greenberg et al. |
| 2009/0079612 A1 | 3/2009 | Parfitt |
| 2009/0085724 A1 | 4/2009 | Naressi et al. |
| 2009/0115573 A1 | 5/2009 | Naressi et al. |
| 2009/0131152 A1 | 5/2009 | Busse |
| 2009/0154548 A1 | 6/2009 | Ijeomah et al. |
| 2009/0222117 A1 | 9/2009 | Kaplan et al. |
| 2009/0234940 A1 | 9/2009 | Pal et al. |
| 2009/0288002 A1 | 11/2009 | Hamilton et al. |
| 2009/0315670 A1 | 12/2009 | Naressi et al. |
| 2009/0322790 A1 | 12/2009 | Behar et al. |
| 2010/0046752 A1 | 2/2010 | Fahrny et al. |
| 2010/0057886 A1 | 3/2010 | Dodge |
| 2010/0070753 A1 | 3/2010 | Kido et al. |
| 2010/0134409 A1* | 6/2010 | Challener et al. ............. 345/156 |
| 2010/0150529 A1 | 6/2010 | Leichsenring et al. |
| 2010/0235631 A1 | 9/2010 | Ayars et al. |
| 2010/0245232 A1* | 9/2010 | Birnbaum et al. ............ 345/156 |
| 2011/0200978 A1 | 8/2011 | Bergan et al. |
| 2011/0231797 A1* | 9/2011 | Huhtala et al. ................. 715/811 |
| 2011/0238782 A1 | 9/2011 | Akadiri |
| 2011/0268428 A1 | 11/2011 | Chen et al. |
| 2011/0320272 A1 | 12/2011 | Upadhyay et al. |
| 2011/0321086 A1 | 12/2011 | Buchheit et al. |
| 2012/0047230 A1 | 2/2012 | Begen et al. |
| 2012/0130810 A1 | 5/2012 | Kilgore et al. |
| 2012/0151408 A1 | 6/2012 | Groth et al. |
| 2012/0223882 A1* | 9/2012 | Galor et al. .................... 345/157 |
| 2012/0249409 A1* | 10/2012 | Toney et al. ................... 345/156 |
| 2012/0284292 A1 | 11/2012 | Rechsteiner et al. |
| 2013/0097009 A1 | 4/2013 | Akadiri |
| 2013/0188055 A1 | 7/2013 | Gazdzinski |

\* cited by examiner

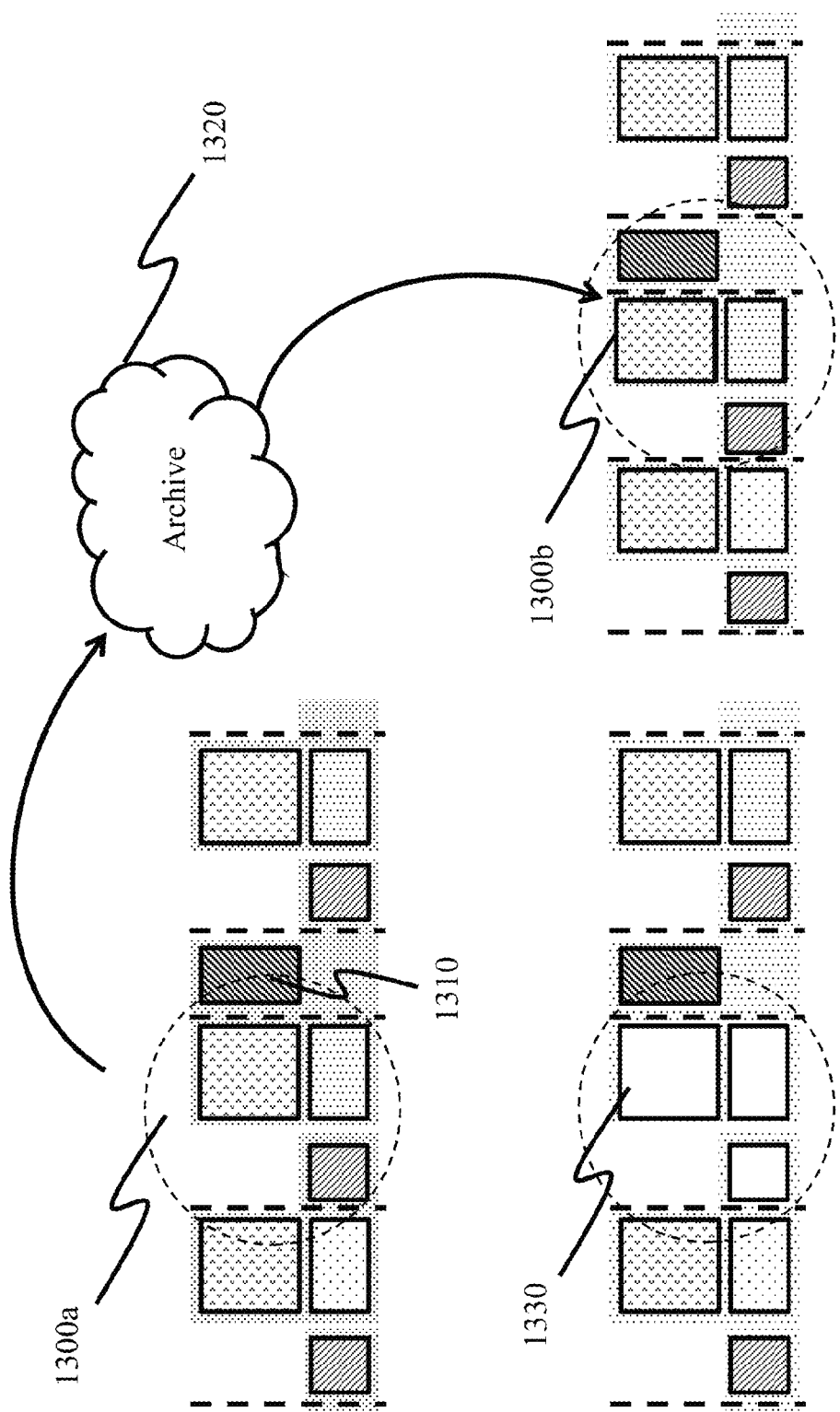

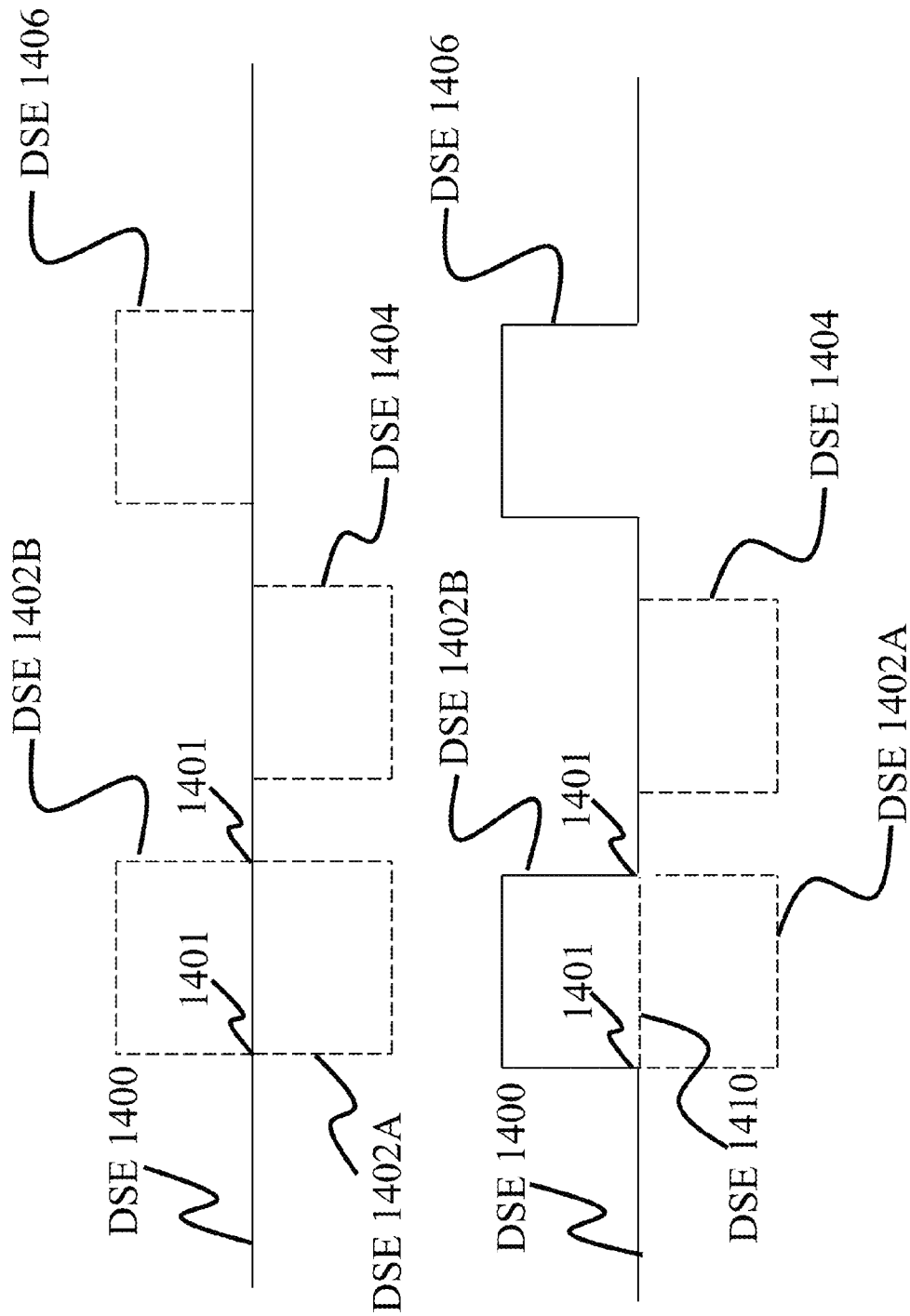

MEDIA DISTRIBUTION SYSTEM

CROSS-REFERENCE TO RELATED APPLICATIONS

This application claims priority to and the benefit of: Non-Provisional patent application Ser. No. 13/773,464 filed Feb. 21, 2013, Provisional Patent Application No. 61/751,823 filed Jan. 12, 2013, and Provisional Patent Application No. 61/767,168 filed Feb. 20, 2013, the contents of which, including all appendices, are hereby incorporated by reference herein for all purposes.

TECHNICAL FIELD

Embodiments relate generally to systems for controlling access to digital content, such as digital media and dynamically changing the digital content. More specifically, the present disclosure relates to systems for controlling access to digital content providing a solution that, in a controlled and determinable way, allows and denies access to content based on a plurality of factors. For example, access to the content may be controlled by a plurality of factors including user activity, media host instructions, and other variables including time and other factors which may be less predictable but more controllable.

BACKGROUND

Media delivery systems may allow for viewing of media content in a manner inconsistent with and in derogation to the wishes of the artist. To remedy this, it may be desirable to control the manner in which media content is accessed.

SUMMARY

One embodiment of the present invention provides a device which may include a visual display interface configured to support the emission of electromagnetic radiation. The emission range considered most important is between approximately 400 nm and 700 nm. In this embodiment the device also may include an auditory interface configured to support the emission of electromechanical waves of frequencies between approximately 20-20,000 Hz. Although the emission spectrum is approximate the lower end of the spectrum is specifically contemplated to be lower in certain embodiments. The embodiment may include an electromagnetic radiation transceiver configured to transmit and receive electromagnetic radiation. The electromagnetic radiation once received is converted to an electronic signal. The embodiment may further provide a user interface. This user interface may take the form of a tactile responsive component such as a capacitive or resistive touchscreen, a keypad, light pen or other technology. As a substitute, and or adjunct to the tactile responsive component, an electromechanical radiation responsive component may be used. This might include a microphone that picks up voice commands or an acoustically activated and controlled menu, or other electromechanical radiation responsive component. This embodiment may also include an electromagnetic radiation responsive component. This might be a camera configured to interpret hand gestures, facial expressions or other visually distinguishable characteristic. In addition the embodiment provides a processor; a memory component; a time measuring device; and an access control controller.

In this embodiment, the user interface may be configured to receive a set of instructions via the user interface and transmit the set of instructions to the processor. This could be something as simple as ordering, displaying or pausing media content. In one embodiment, the electromagnetic radiation transceiver may be configured to receive partitioned media content and the transceiver may be configured to send the partitioned media content to the memory component for storage and subsequent release.

In one embodiment, the memory component may be configured to store the partitioned media content and the access control controller regulates access to at least a portion of the partitioned media. Some content, teasers, trailers, and selected other content may not always be regulated.

The access control controller may include a function limiter configured to disable at least a portion of the user interface during the occurrence of specified events. In this case the function blocked may be fast forward, but in another embodiment the volume control, rewind or other features may be disabled. In this embodiment, the access control controller may include a position determining component comprising at least one of the following a terrestrially based position determining component, this might be a Wifi Hotspot, a cell phone tower triangulation, a unique landmark that is visible to a camera. It is specifically contemplated that photograph of a unique mark may serve as a proxy for actual position determination. Thus a barcode found only in an air terminal may serve to confirm a user's location at the time the photograph was taken. In other embodiments a satellite based position determining component may be used, or a hybrid of terrestrially and satellite based position determining devices.

In this embodiment the access control controller includes additionally may include an instruction creating component comprising at least one of the following: a user interface sensor configured to identify and record select predefined activity occurring at the user interface. The activity may be a cue that the user is interested, bored or otherwise engaged. It is contemplated that keystroke patterns and pauses may be used to identify a user without the need to sign in. Further, in this embodiment the predefined activity may be when the viewing of a downloaded episode of content is first viewed.

In some embodiments, it may be desirable to change a rule regarding access, in this case a communication interface sensor may be configured to identify and record input from the communication interface and give preference to this instruction as opposed to locally generated instructions relating to content accessibility. In addition, the access control controller may look to a receiver configured to receive input from at least one of a time measurement component or position determining components. Additionally, the access control controller may not control access to all delivered partitioned media; however, the access control controller may have the ability to do so. Specifically, if content has been released, usually the access control controller will no longer control or restrict access to the element.

One embodiment of the present invention provides a device which may include a visual display interface configured to support emitting electromagnetic radiation between approximately 400-700 nm; an auditory interface configured to support emitting electromechanical waves of frequencies between approximately 20-20,000 Hz; an electromagnetic radiation transceiver configured to transmit and receive electromagnetic radiation; a user interface comprising at least one of: a tactile responsive component; an electromechanical radiation responsive component; and an electromagnetic radiation responsive component; a processor; an addressable memory component; a time measuring device; and an access control controller; where the user interface is configured to: receive a set of instructions via the user interface and transmit the received set of instructions to the processor; wherein the electromagnetic radiation transceiver is further configured to receive partitioned media content; and the electromagnetic radiation transceiver is configured to send the partitioned media content to the addressable memory component; wherein the addressable memory component is configured to store the partitioned media content; wherein the access control controller regulates access to at least a portion of the received partitioned media content and the access control controller comprises: a function limiter configured to disable at least a portion of the user interface during an occurrence of specified events; a position determining component comprising at least one of: a terrestrially based position determining component; a satellite based position determining component; and a hybrid of terrestrially and satellite based position determining devices; and an instruction creating component comprising at least one of: a user interface sensor configured to identify and record select predefined activity occurring at the user interface; a communication interface sensor configured to identify and record input from a communication interface; and a receiver configured to receive input from at least one of a time measurement component or position determining component; and wherein the access control controller controls access to at least a portion of all delivered partitioned media content using the function limiter, the position determining component, and the instruction creating component.

In another embodiment of the device the processor may be further configured to store a set of instructions until at least one of the following events occurs: (a) the device identifies a wireless network; (b) the device is interfaced with an internet connection; and (c) the device comes in contact with another component capable of receiving and retransmitting signals from the device. Optionally, the user interface may be further configured to include a plurality of panels, where the plurality of panels comprise a plurality of states, and where the plurality of states correspond to at least one of: an availability of the partitioned media content; a location of the partitioned media content, a portion of the partitioned media content, and a description of the partitioned media content. In addition, at a point in time, the plurality of panels on the user interface may be substantially constant but the content of the panels may be changed by at least one of a content provider or the user interface. In one embodiment, the device further comprises a query component where the query component may be configured to capture a user input and record a response. In addition, a set of responses may extract information from the operation of the computing device and, via the interface, transmit the information to a remote data repository. In another embodiment a portion of the partitioned media content may be temporarily removed from the device based on input from a user, and where input from the user may add substantially identical content back to the device. Optionally, the function limiter may be further configured to disable the ability to accelerate the rate of media display on an initial displaying. Additionally, the position determining component may be a camera interfaced with the device and the device recognizes an image provided by the camera. Optionally, the image provided by the camera may be a man-made image selected from: a barcode; a quick response code; and a high contrast two dimensional image; and where the man-made image may be located at a known location.

Embodiments of the apparatus for customizing content delivery may comprise: a visual display interface configured to support emitting electromagnetic radiation between approximately 400-700 nm; an auditory interface configured to support emitting electromechanical waves of frequencies between approximately 20-20,000 Hz; an electromagnetic radiation transceiver configured to transmit and receive electromagnetic radiation; a user interface comprising at least one of: a tactile responsive component; an electromechanical radiation responsive component; and an electromagnetic radiation responsive component; a processor; an addressable memory component; a time measuring device; and a selector switch; where the user interface may be configured to: receive a set of instructions via the user interface and transmit the received set of instructions to the addressable memory component; wherein the electromagnetic radiation transceiver may further be configured to receive partitioned media content; and the electromagnetic radiation transceiver may be configured to send the partitioned media content to the addressable memory component; wherein the addressable memory component may be configured to store the partitioned media content. Optionally, the selector switch may be configured to receive input from the addressable memory component and the selector switch configured to utilize the input to switch between a default mode and at least one non-default mode and where the default and non-default modes prefer certain portions of partitioned media content that is in the addressable memory component; the certain portions of partitioned media content may be conveyed to the visual display interface and the auditory interface; and the selector switch may be configured to optionally discriminate between only: content conveyed to the auditory interface; content conveyed to visual display interface; a combination of both the auditory interface and the visual display interface. In one embodiment, the selector switch may discriminates in real time between the default and the at least one non-default mode in substantially real time. Optionally, the selector switch may rely on data in the addressable memory component. An exemplary embodiment includes tablet computer, e.g., an iPad, including a user interface connected, a selector switch configured to select between a default mode and at least one non-default mode; a first database configured to store media and including a plurality of storage regions; a second database configured to receive input from the iPad user interface; and where the selector may be configured to receive input from a second database and the selector may be configured to provide instructions to the first database.

BRIEF DESCRIPTION OF THE DRAWINGS

Embodiments are illustrated by way of example and not limitation in the figures of the accompanying drawings, and in which:

FIG. 13 depicts an embodiment that allows for archiving of media;

FIG. 14 shows an exemplary storyline where the x-axis represents time and the y-axis represents content.

DETAILED DESCRIPTION

Figure 1:
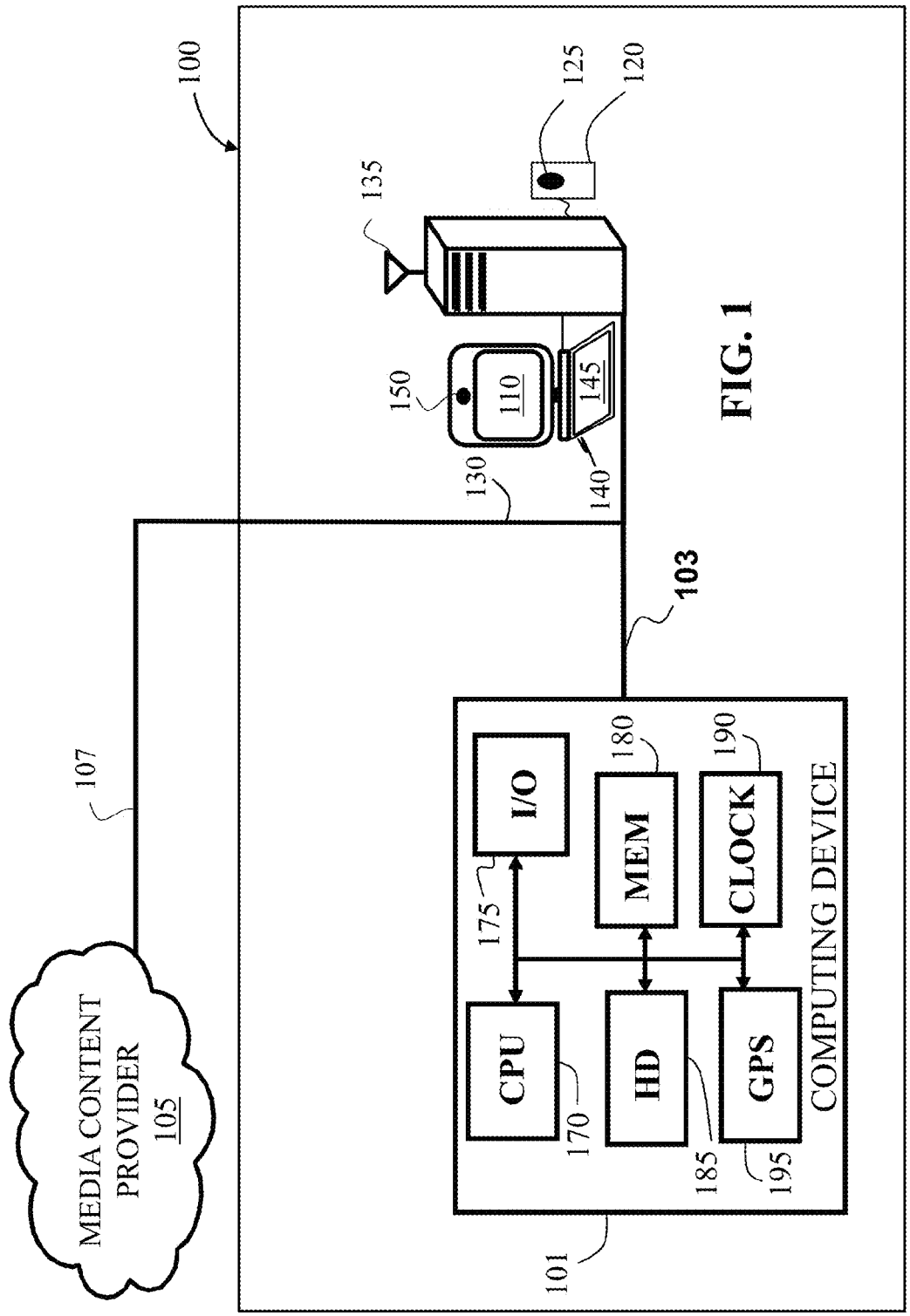
FIG. 1 is an exemplary embodiment of a computing system that includes a computing device and a content provider.

One embodiment of the present invention, as illustrated in FIG. 1, provides a computing device 100 where the computing device 100 may comprise a visual display interface 110, an auditory interface 120, a communication interface 130, a user interface 140, an electromagnetic radiation responsive component 150, and an access control controller 101. In some embodiments the visual display interface 110 may be configured to support the emission of electromagnetic radiation. Although it is contemplated that the visual display interface 110 may emit throughout the entire visible spectrum of approximately 400 nm to 700 nm, other embodiments may include a monochrome visual display interface 110 displaying in a much narrower range and, optionally not emitting electromagnetic radiation but rather reflecting incident radiation. In the non-emitting embodiment, the visual display interface 110 may be either full color, monochromatic, or something less than full color but more than monochromatic. Specifically, the visual display interface 110 may be limited to black and white, black, gray, and white, black and green, or other limited colors.

In some embodiments, the computing device 100 may include the auditory interface 120 that may be configured to support the emission of audio signals in the form of electromechanical radiation. Optionally, the auditory interface 120 may comprise an electromechanical radiation responsive component 125. Although in this embodiment the range may be in the range usually audible to humans, that is frequencies between 20-20,000 Hz, wider range of frequencies may specifically be contemplated including lower frequencies and significantly higher frequencies. The frequencies outside the audible range of humans may be used in application to create certain moods and effects.

In one embodiment, the communication interface 130 may be configured to transmit and receive electronic signals. This includes signals from a wire or wireless source. FIG. 1 shows an embodiment with a wireless communication interface 135. The exemplary embodiment may be configured to receive and transmit signals, including user provided data related to taste, preferences, activity level, degree of mobility, payment information, peer leadership position, physical and geographic information, and other information including certain behavioral characteristics.

In some embodiments the user interface 140 may include a tactile responsive component 145. In one embodiment this may be a standard keyboard, and/or pointer-mouse system and/or a touch screen 145. However, the tactile responsive component need not respond to the pressure exerted by an object making physical contact but rather may respond to a disturbance of light or other electromagnetic phenomenon within the proximity of a predefined tactile responsive area and optionally may receive input manually via a proximity device, such as a radio frequency identification (RFID) tag or transponder.

In one embodiment, the electromagnetic radiation responsive component 150 may be presented. The electromagnetic radiation responsive component 150 may be configured to receive electromagnetic radiation and convert the received electromagnetic radiation to an electronic signal which may be processed or stored, or stored and subsequently processed, or processed and stored, or some combination thereof. An electromagnetic radiation responsive component 150 may use a focal plane array, a bolometer, or other photon capturing component. While a solid state component responsive to incident photons is contemplated, other systems may also be used in some applications with equal success. In some instances it is contemplated that InSb, GaAs, and HgCdTe and other lower energy focal plane arrays may be captured. These may be used in conjunction with arrays that are responsive to electromagnetic radiation that is substantially within the visible region. Additionally, a charged coupling device, or charge-coupled device (CCD) image sensor or a complementary metal-oxide-semiconductor sensor may also be added, to serve in lieu of, or as a substitute for, the infrared sensors.

In one embodiment, the computing device 100 may include a central processing unit (CPU), e.g., a processor 170, where the processor 170 may be configured to undertake a plurality of operations, as discussed herein, including signal processing and execution of instructions derived from the signal processing. Additionally, embodiments may also include an addressable memory 180, for example, read only memory (ROM) or random access memory (RAM), a data store 185, a time measuring device 190, and an input/output interface 175. In one exemplary embodiment, the general handling of data, processing of data, and communication and display of data may be handled at the CPU level of the computing device by an operating system.

In some embodiments the user interface 140 may be configured to receive a set of instructions via the user interface 140 and transmit 103 the set of instructions to the processor 170. In other embodiments the communication interface 130 may be configured to receive media content 107 from a media content provider 105. It is contemplated that the computing device 100 may be configured to send the media content to the addressable memory 180. The display interface 110 is, in some embodiments, configured to display at least a portion of the media content.

In one embodiment the access control controller 101 may include a component configured to disable at least a portion of the user interface 140. In some embodiments the access control controller 101 may further include a terrestrially based position determining component 195. The terrestrially based position determining component 195 may include a cellular network, antenna array, detected area network, or other evidence of location, such as a discernible landmark. Discernible landmarks may operate in conjunction with the electromagnetic radiation responsive component 150. In another embodiment the position may be determined by a satellite based position determining component. In other embodiments a hybrid of terrestrially and satellite based position determining devices may be utilized, or even a hybrid of terrestrial systems or a hybrid of satellite based systems. Additionally, in some embodiments, a time measurement component 190 may be included. This may be locally maintained, non-locally maintained, or locally maintained and non-locally updated. An exemplary embodiment may specifically include a non-user accessible clock 190. In another embodiment, a time measurement device (not shown) may be visible but may not be altered by the user. In another embodiment, the time measurement device may have adjustable permissions to allow alteration or limited alteration including changing of the clock speed. In some embodiments the access control controller 101 may be configured to control access to additional media content based on at least one of: an input from the user interface 140; an input from the communication interface 130; and a set of instructions from the addressable memory 180.

In another embodiment, the access control controller 101 may be configured to render at least a portion of the media content unavailable based on a set of instructions received from the processor 170; and the processor 170 may further be configured to store a set of instructions pending the occurrence of a triggering event. A triggering event may be a computing device identifying an accessible wireless network. This would have application where a command is stored in a queue pending linking to the Internet 105 or other distributed databases. This would have specific application where content was previously purchased, and unlocked, but the payment processing step was not completed either because of an interruption, or because of issues related to connectivity. In another embodiment, the computing device 100 may be interfaced with an Internet connection when the computing device 100 comes in contact with another component capable of receiving and retransmitting signals from the computing device. In this situation the computing device may rely on a node to capture and re-convey data to a distributed database such as the Internet.

Some embodiments of the present invention involve streaming source content or media, such as video—both visual and audio, streaming visual data, streaming audio data, and streaming control data. Such streaming source content may be from pre-stored or live data stream, and/or from one sender to one or more clients or receivers. Streamed source content elements or data units are typically transmitted by a sender, e.g., a server/server application or sender entity, and received by a receiver, e.g., client/client application or receiver entity. The receiver or client may start presenting or playing back the source content as soon as the receiving client application has sufficient data units or content elements stored in its receiving buffer, alternatively, the receiver or client may store the entire content before providing a user the ability to select portions of the downloaded content for viewing. The playback or presentation typically continues until the end of the presentation of the source content.

Figure 2:
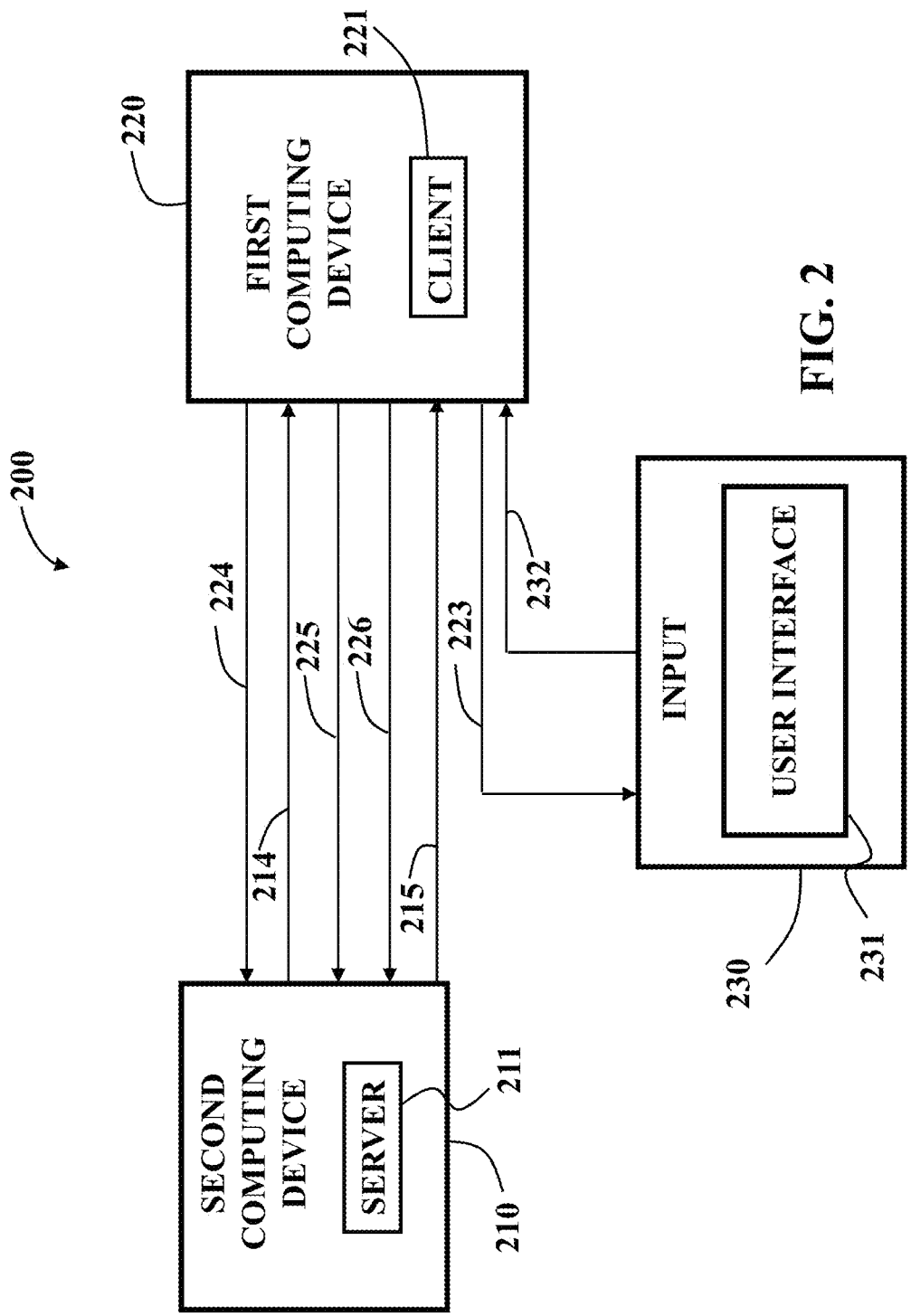
FIG. 2 is an exemplary embodiment of a system that includes a first computing device and a second computing device in a networked environment.

FIG. 2 depicts a client/server system 200 where the client and server are in communication with each other. In this embodiment, the first computing device 220, e.g., a client 221, and the second computing device 210, e.g., a server 211, are depicted as communicating with each other. Additionally, the first computing device 220 may comprise a user interface 231 to provide user input 232 to the first computing device 220. In this exemplary embodiment, the client 221 initiates a request 224 to the server 211 requesting media content. The server 211 may then respond 214 by sending an entire media content, for example, an entire season of a show, to the client 221 or may respond 214 by sending a partial media content, including a plurality of distinct packets. The client 221 may also have the option of sending information regarding the purchase 225, for example, payment information, along with other user information 226 to the server 211. The server 211 may at any point send other subsets of media content 215 to the client, e.g., via pushing the data. In some embodiments, the client 221 may comprise an input component 230 that includes a user interface 231. The user interface 231 may send information collected 232 as input by the user to the client 221 and client 221 may in return send media content 223 to be displayed to the user.

Figure 3:
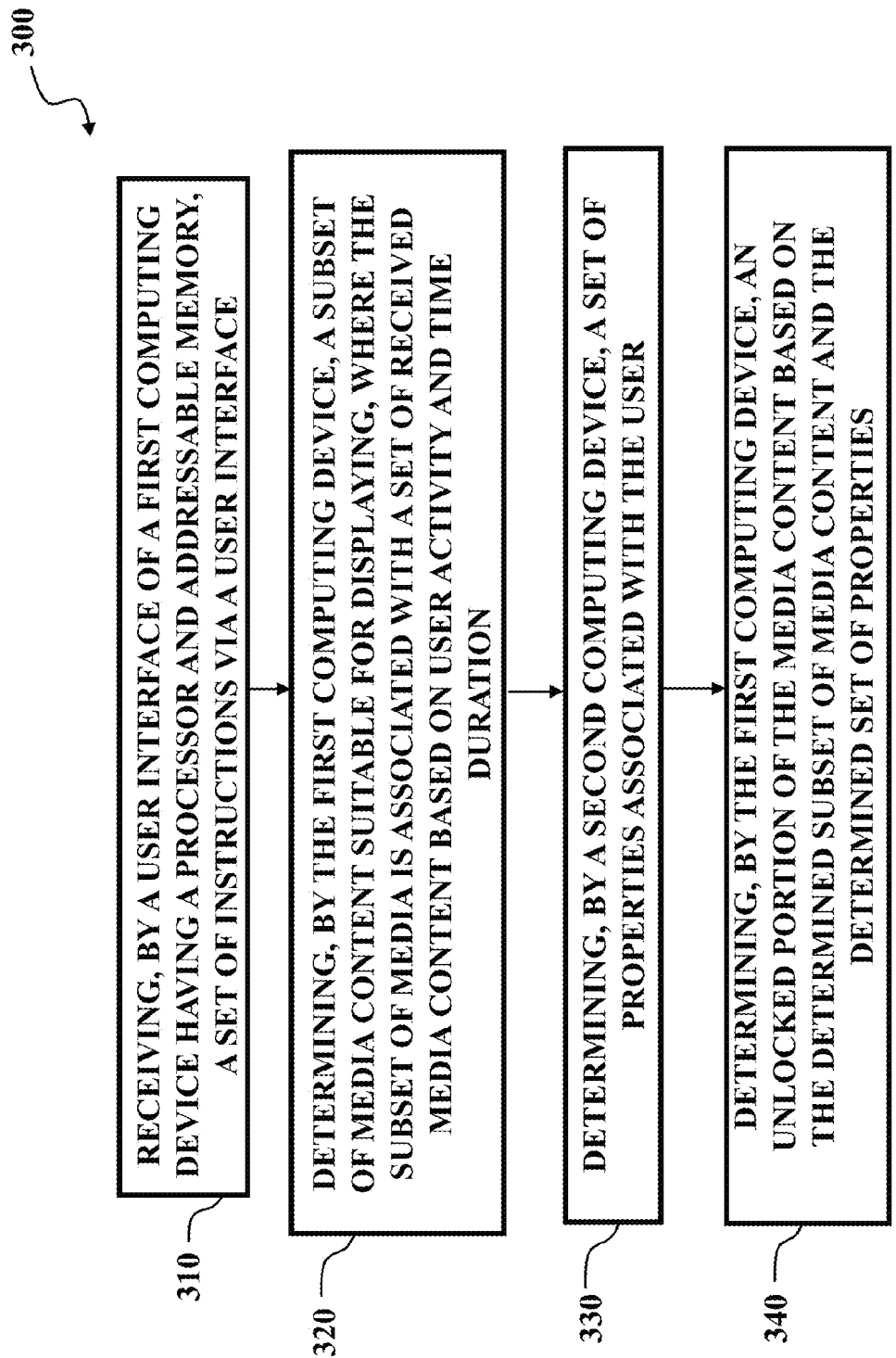
FIG. 3 is a flowchart of an exemplary process for determining media content.

FIG. 3 is a flowchart of an exemplary system environment 300. The method depicted in the diagram includes the steps of: (a) receiving, by a user interface of a first computing device having a processor and addressable memory, a set of instructions via the user interface (step 310); (b) determining, by the first computing device, a subset of media content suitable for displaying, where the subset of media may be associated with a set of received media content based on user activity and time duration (step 320); (c) determining, by a second computing device, a set of properties associated with the user; (step 330); and (d) determining, by the first computing device, an unlocked portion of the media content based on the determined subset of media content and the determined set of properties (step 340).

Figure 4:
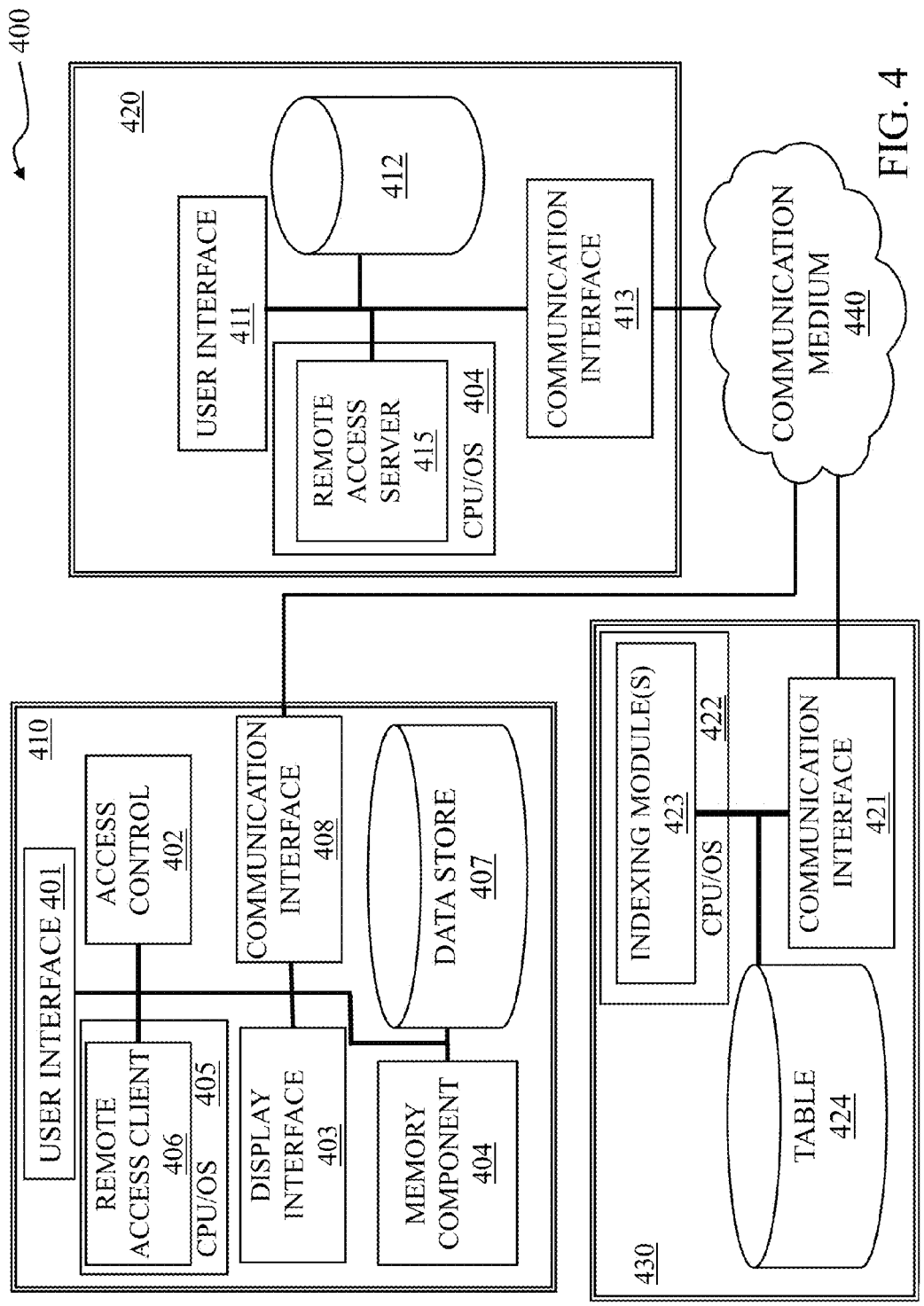
FIG. 4 is an exemplary embodiment of a computing system that depicts a set of computing devices connected through a communication medium.

FIG. 4 illustrates an exemplary embodiment of FIG. 1 in greater detail where the networked system 400 comprises a first computing device 410, a second computing device 420, and a third computing device 430, where the computing devices 410, 420, 430 are networked via a communication medium 440. As an exemplary client node, the first computing device 410 is illustrated as having a user interface 401, an access control controller 402, a display interface 403, a memory component 404, and a central processing unit (CPU) 405 having an operating system (OS) configured to host the remote access client 406. In some embodiments, a data store 407 may be present to store the one or more media content files received by the computing device 410 via the communication interface 408. As an exemplary server node, the second computing device 420 is illustrated as having an optional user interface 411, a data store 412, a communication interface 413, and a CPU 404 having an OS configured to host a remote access server. As an optional exemplary server node, the third computing device 430 is illustrated as having a communication interface 421, a CPU 422 having an OS configured to host a server and one or more indexing module(s) 423 configured to access a data store, e.g., a table 424, for remote access to computing nodes responsive to one or more communications from the computing device 410. In an exemplary embodiment, the first computing device 410, e.g., a client, may request media content from the second computing device 420, e.g., a server, where the media content being requested may optionally be stored at the third computing device 430, e.g., another sever, where the third computing device 430 may be used for remote storing of the media content.

A user interface 401, 411 of FIG. 4 may have at least one user interface element. Examples of user interface elements comprise input devices including manual input such as buttons, dials, keyboards, touch pads, touch screens, mouse, and wheel related devices and voice and line-of-sight interpreters. Additional examples of user interface elements comprise output devices including displays, tactile feedback devices and auditory devices. A display may be large enough for a user to visualize a portion of the media content, and the display may be configured to support scrolling to display additional portions.

By delivering media content, e.g., episodes, in non-linear fashion and rewarding the user for prompt viewing, e.g., by early unlocking of next content, the user may achieve a status among the user's peers by being the first to discover and view the content. Thus, as an example, a user may view a twenty (20) minute episode and the viewing will be noted on a digital scorecard which may be visible to a subset of other viewers, where the subset may include all or a fraction of other viewers. The subset may be self-selected, selected by the user, selected by the content provider based on common interests or geographical region or other factor or factors.

In one embodiment, as soon as a viewer starts displaying content the activity may be posted to a virtual bulletin board, such as a social networking site. Others in the peer group may be able to see that new content is available and that a peer has accessed the content. In some embodiments, a score may be kept based on the member of the peer group who views the content first, and the score may be used as a status symbol and may also be used to accumulate perks from the provider such as additional content, recognition, and other rewards. In one embodiment the recognition may include real or virtual tokens that may be exchanged for merchandise that is only available at the provider's gift shop.

In some embodiments, content may not only be delivered in a predictable way, content may also be delivered in unpredictable ways and in widely varying durations. For example, an episode may be thirty (30) seconds and may be little more than a beat, such as a definitive discovery, a decision, or an event. The episode may also be an additional episode appearing as a prologue to an already viewed episode, thus delivery need not always follow a linear or chronological pattern. As stated elsewhere, the content of episodes may be changed dynamically. Thus an episode may, upon subsequent displaying, include different, additional or less content. The changes may occur after a triggering event, for example, first viewing, if an episode has been available to a user for a period of time without being viewed, or for other reason.

In one embodiment, the present invention provides a panel of display screens where the display screens may each correspond to a portion of content. The display screens may each possess characteristics that convey to a user at least one of the availability of the content, a portion of the content, whether the content has been previously viewed and attributes of the content. In one embodiment, the panel of display screens may be infinitely adjustable, thus the screens may be displayed in a chronological sequence based on when content became available, based on where content fits into the story line, even when content is supplied, or made available, out of chronological sequence, or where content provides a more or less inclusive description of previous or future content.

By way of example, an episode, or first content component, may be released on day one, a second episode or content component may be released on day five. The first and second content components may appear to be sequential and are viewed in chronological order. However, a third content component may be interspersed between the first and second content component. In one embodiment, this third content component may need to be accessed prior to a fourth content component becoming available. In another embodiment the third content component may become available but need not be accessed prior to the fourth content component becoming accessible. In another embodiment, the third content component may be visibly present but not accessible until after another component, previously accessed, is accessed again.

In one embodiment, access to content is controlled but has a consistent rule set. The rule set allows users who understand and master the rules to access content before their non-rule savvy counterparts. In creating the rule structure and the following of those who understand the system the embodiment is able to develop an invested following. In addition, by managing access and rewarding knowledge of distribution nuances viewers form a fraternity where they may collaborate to unlock content and receive recognition in a virtual venue.

In one embodiment, the content may be unlocked by two or more users beginning a viewing session within a specified period of time after release and within a specified period of time of each other. In this embodiment if content is made available, for example at 3:30 AM, and three users all start watching within fifteen (15) seconds of 3:35 AM, they may earn a real reward, virtual recognition, or access to additional content. Such additional content may be made available to only a certain number of viewers.

In another embodiment a prompt may ask users if they wish to disclose certain media access behaviors to others. In this context others may include a virtual group of followers such as might be on a social media site, or via notification using another system. The others may be a self-selected group, a user selected group, a group selected by the content provider or some combination or other criteria.

Figure 5:
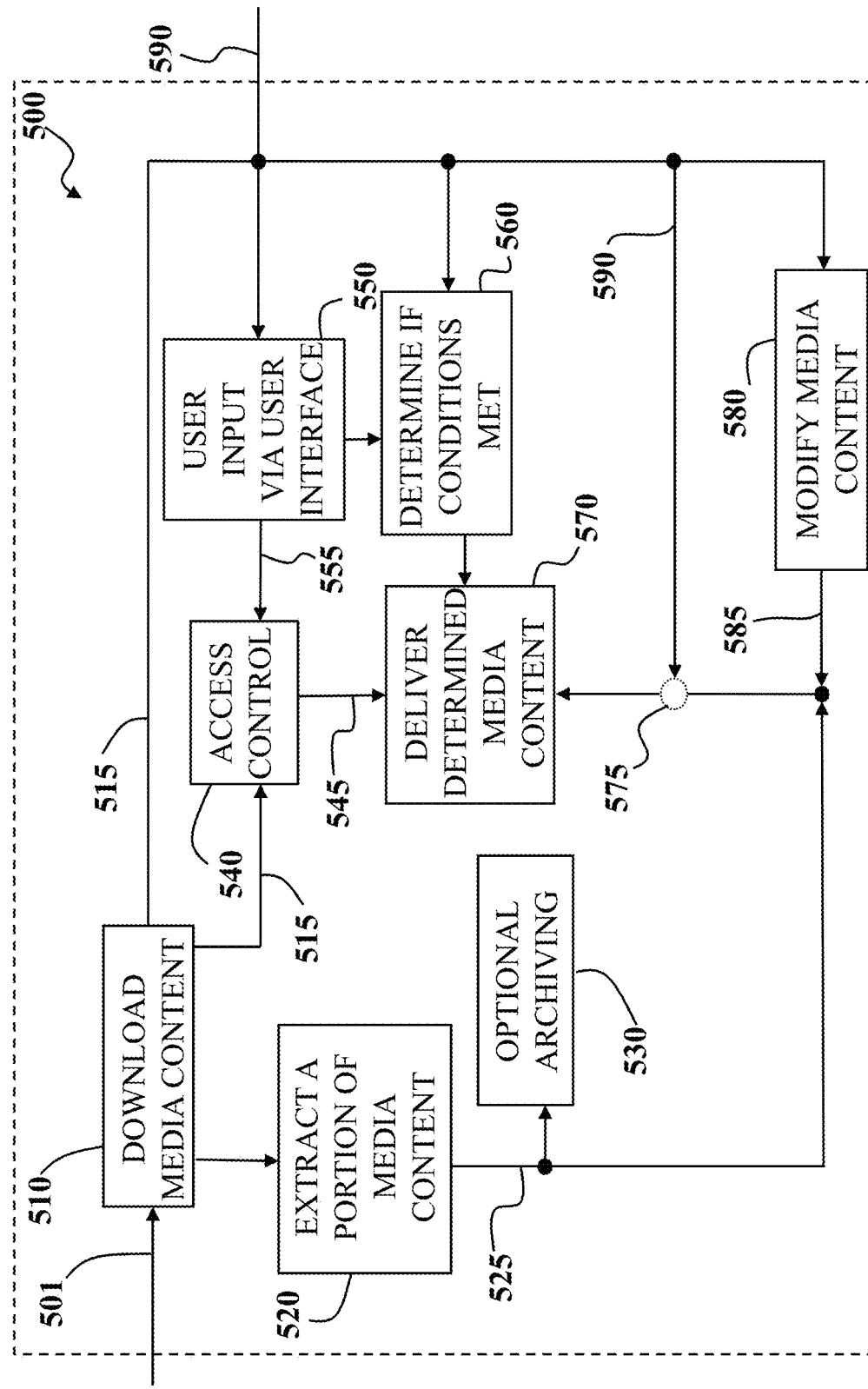
FIG. 5 is a functional block diagram depicting an exemplary process of a computing device for processing of media content.

FIG. 5 depicts a functional block diagram of an exemplary computing device 500. In one embodiment, media content 501 may be received, e.g., downloaded 510 to the computing device 500. Once the content is downloaded, the downloaded media content may be categorized where a portion of the media content may be extracted 520 and optionally, the extracted portion 525 may be sent to an archiving component 530 so that the data is stored for future use, for example, future access to the content. Additionally, content, for example, the extracted portion of the downloaded media content 525, may be combined with other content. The computing device 500 may also receive as input, user data 590, corresponding to a user, and more specifically to a user activity. In some embodiments, the user data 590 may be received via a user interface 550, from a remote server, or previously stored on the computing device 500. The user data 590 may also be used to determine if certain conditions have been met 560, where the conditions may be any of the following: status of user, location of user, user associations, user tendencies, user payments, previous user inputs, likely future user inputs. An access control 540 may take as input a set of one or more of the following: downloaded media content 515 and user input data 555. In some embodiments, user data 590 may also be used to modify 580 the received or downloaded media content 515. Optionally, modified media content 585 may then be combined 575 with user data 590 and provided as input to determine what media content may be delivered 570 to a display device. In one embodiment, once access to media content has been determined 545, the determined media content may be delivered 570 along with any modified content 580 that may have been determined based on the user data 590.

In one embodiment, additional content may be introduced after the content has already been accessed, and such additional content may be introduced surreptitiously. Notification of such surreptitious addition may, for example, be made to a limited number of users based on certain criteria such as status as peer leader, or venue where notification is made. Such venue may include a "members only" website, a portable electronic device associated with a specific user, an invitation to visit a location. In one embodiment the location may be a real physical location and in another embodiment the location may be a virtual location.

In one embodiment, content is loaded onto a media player but is not discernible to the user until the content is paid for. That is, the content is loaded onto a player but is only accessible upon receipt of payment by a user, receipt of goods or services by a user, or a promise to make payment. It is specifically contemplated that the user will be able to make payment based on status as a peer leader, where peer leadership—in this context—may include services that have the effect of promoting certain media content. Optionally, in another embodiment, certain goods provided to a third party, such as canned goods to a relief organization, may serve to unlock content.

Figure 6:
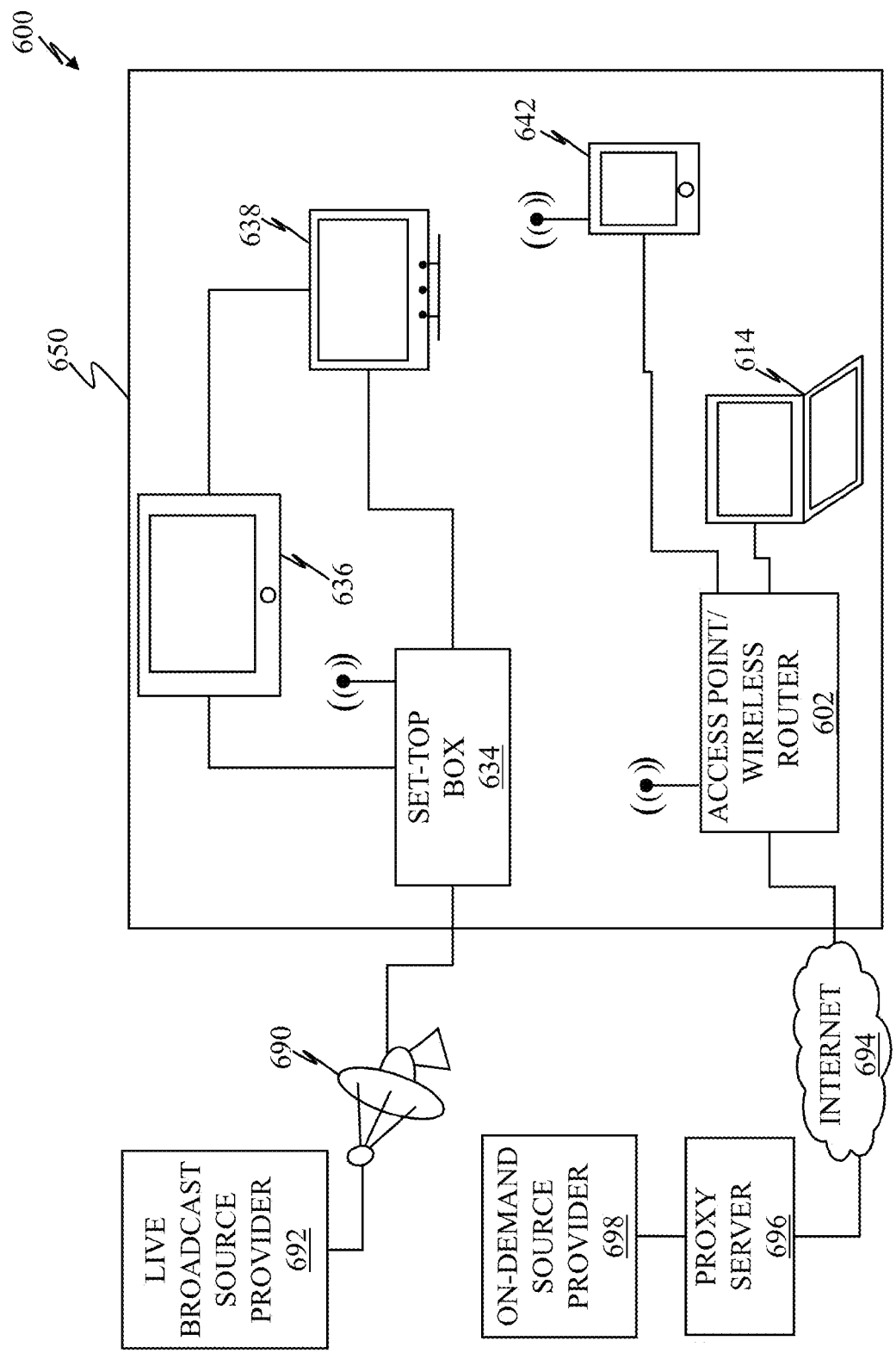
FIG. 6 is a functional block diagram depicting an exemplary process of a user content media reception.

FIG. 6 is an exemplary diagram of a system 600 wherein digital source content, such as audio and/or visual data, are transmitted or streamed according to some embodiments of the invention. In this exemplary embodiment, a local network 650 may comprise a number of consumer electronics, including a set-top box 634, a digital television (DTV) 638, a wireless computing device 642, e.g., an iPad, a digital video player 636, e.g., an iPad, a computer laptop 614, a gateway/router 602, connected via various network links or segments. These various consumer electronics may be configured to be networked with each other. The local network 650 comprises various networks—e.g., power line communication (PLC) networks, 802.11a wireless networks, 802.11g wireless networks, and 802.11b wireless networks. Future network specifications may also be incorporated in such networks, Ethernet networks, and various network segments, which may include wired and/or wireless network segments. The local network 650 may be operably coupled to one or more source content providers 692, 698, for example, via satellite, cable, and/or terrestrial broadcast 690 or via an external wide area network, such as the Internet 694. A source content provider 692, 698 may provide pre-encoded and stored source content and/or live real-time or substantially real-time encoded source content to be received by a receiver/client and accordingly be presented in a user interface. For example, a media content may be requested from a source provider 698 that provides on-demand pre-encoded and stored data. The encoded source content is then transmitted and streamed over network segments, which may include wide, local, and/or metropolitan area network segments. This source content is then received by a computing device, e.g., a set-top box 634. In some embodiments, a source provider or an intermediate network node also has one or more proxy servers 696 that are operably connected to the source provider 698. A proxy server 696 thus may be a node in the system, for example, where source content may directly or indirectly be requested.

Figure 7:
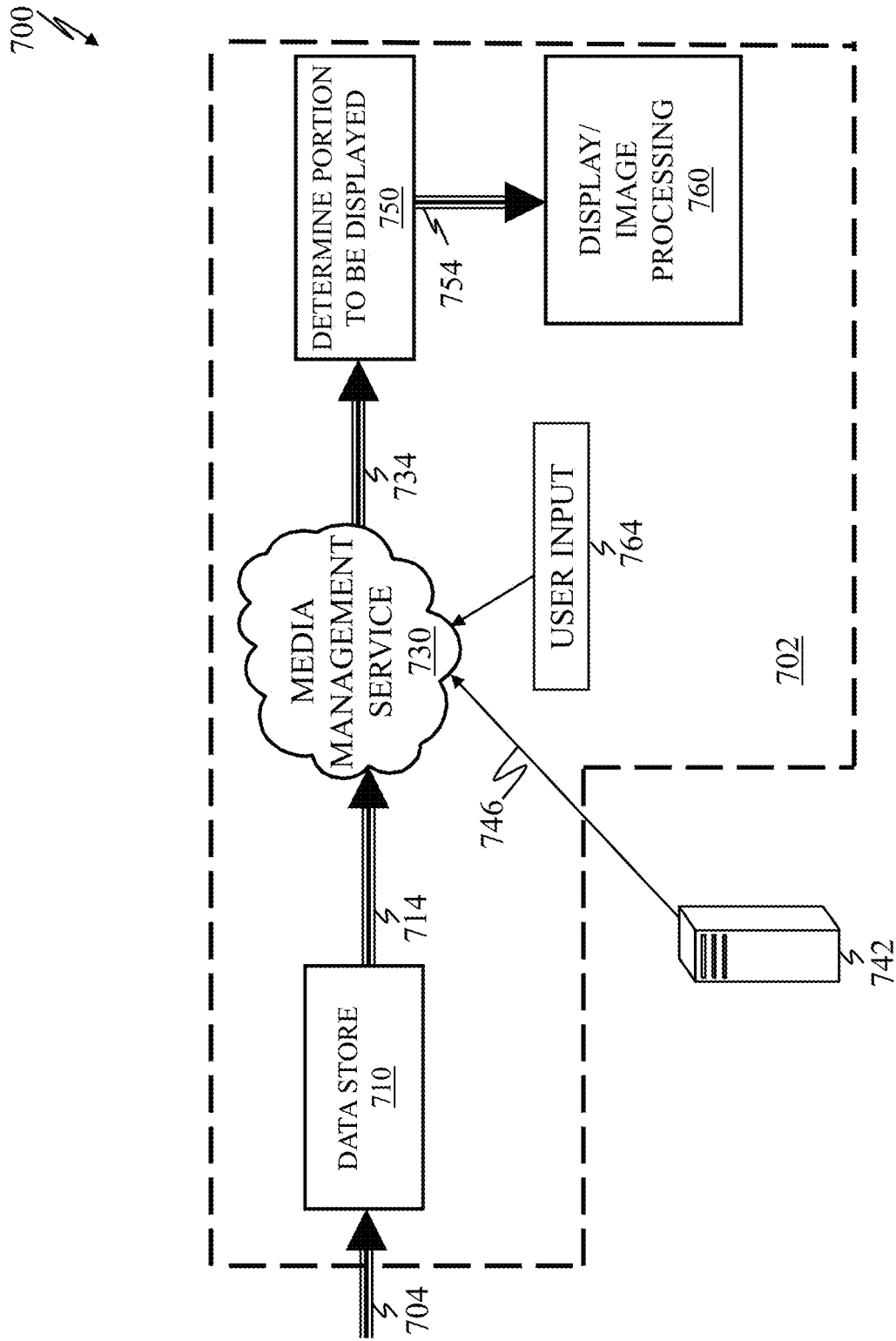
FIG. 7 is an exemplary top level functional block diagram of a computing device embodiment displaying media content.

FIG. 7 depicts a block diagram of an exemplary embodiment of the media management service 730 of the access control controller 700. In this embodiment, media content 704 may be received by the computing device 702 where the computing device 702 optionally comprises a data store 710 and where the data store 710 may store the received media content 704 or alternatively, a subset of the media content. In some embodiments, the media content 704 may comprise a set of one or more media contents 714. The set of one or more media contents 714 may then be sent to a media management service 730, where the media management service 730 may be running on the computing device 702. In one embodiment, the media management service 730 may also receive as input a set of user input 764 and other user data 746 received from a server 742. Optionally, the server 742 may reside outside of the computing device 702. In one embodiment, the media management service 730 may identify which set of the set of one or more media content 714 may be accessible based on the received set of one or more media content 714, the user input 764, and user data 746. In one embodiment, a separate service 750 may determine what portion of the identified set of media content 734 may be sent to the display, for example, which chapter of a list of chapters on the right column of the screen. A display/image processing unit 760 may then receive the determined set of the media content 754 that are to be displayed.

Figure 8:
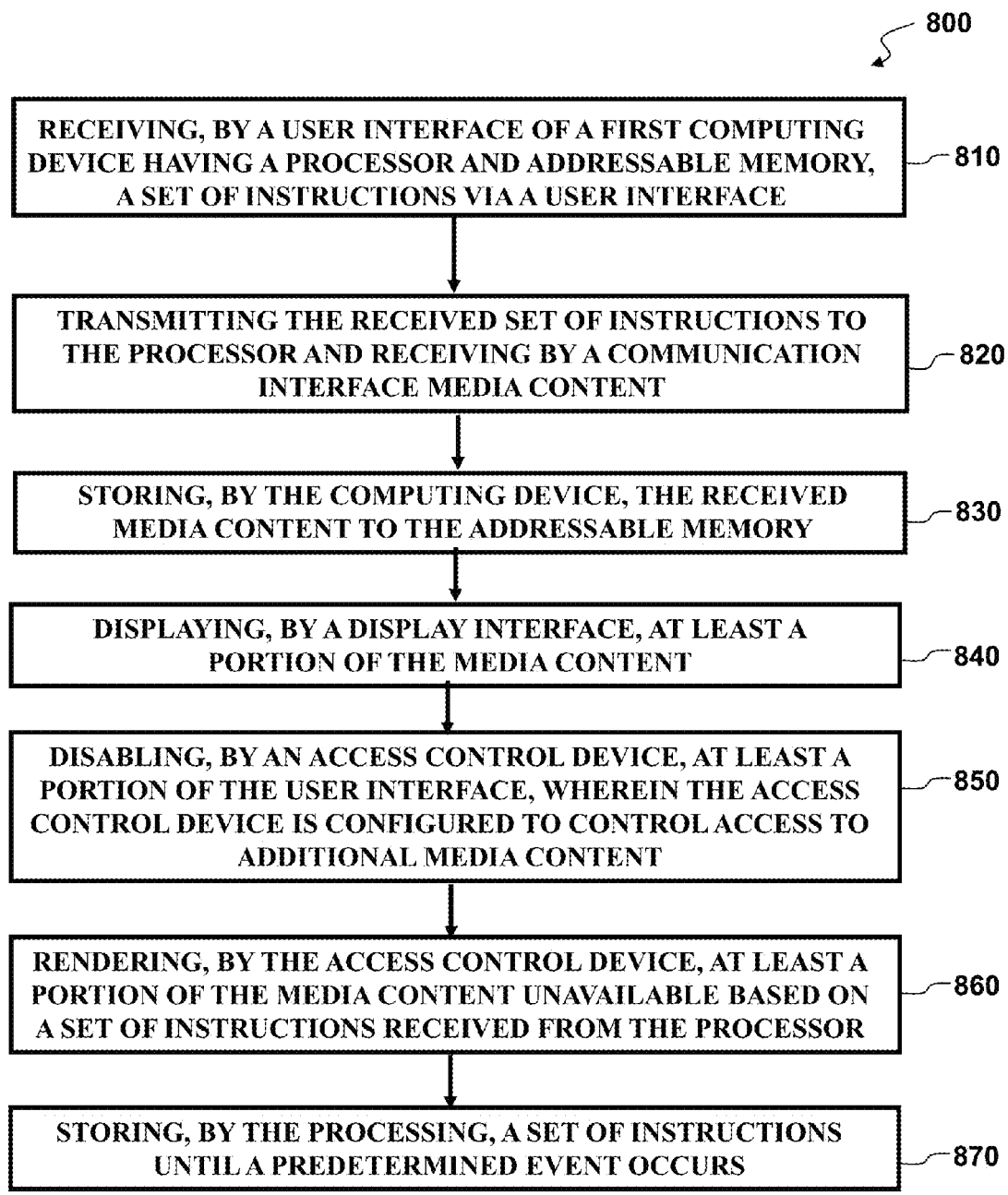
FIG. 8 is a flowchart of an exemplary process for determining media content.

FIG. 8 is a flowchart of an exemplary process 800 in which the computing device comprises a processor and/or computing circuitry that may be configured to execute the steps as depicted. The present invention may also be embodied as a process. For example, embodiment of the present invention includes a machine-enabled method of content media distribution at a computing device via a user interface, the computing device comprising a processing unit and addressable memory and a display, and the method comprising steps, not necessarily in the following order, of: (a) receiving, by a user interface of a first computing device having a processor and addressable memory, a set of instructions via a user interface (step 810); (b) transmitting the received set of instructions to the processor and receiving by a communication interface media content (step 820); (c) storing, by the computing device, the received media content to the addressable memory (step 830); (d) displaying, by a display interface, at least a portion of the media content (step 840); (e) disabling, by an access control controller, at least a portion of the user interface, wherein the access control controller is configured to control access to additional media content (step 850); (f) rendering, by the access control controller, at least a portion of the media content unavailable based on a set of instructions received from the processor (step 860); and (g) storing, by the processing, a set of instructions until a predetermined event occurs (step 870).

Figure 9:
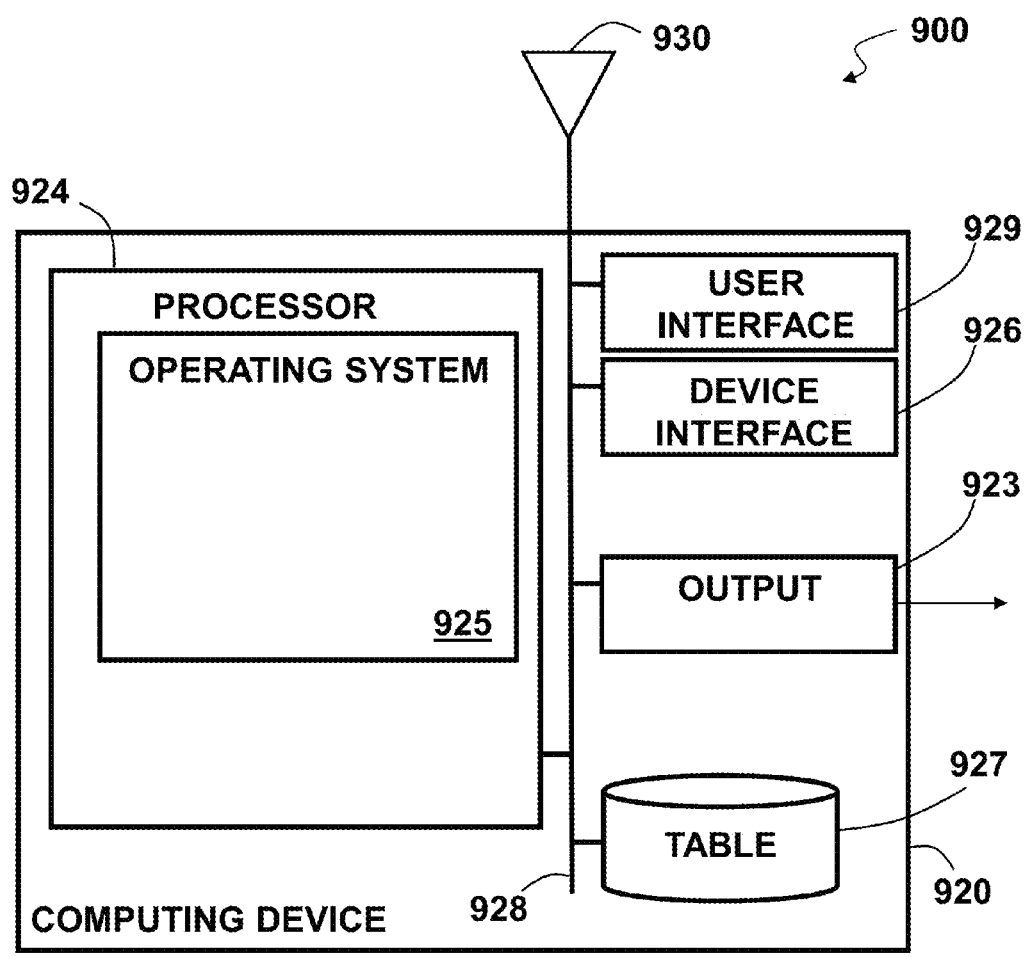
FIG. 9 is an exemplary top level functional block diagram of a computing device embodiment.

FIG. 9 illustrates an exemplary top level functional block diagram of a computing device embodiment 900. The exemplary operating environment is shown as a computing device 920 comprising a processor 924, such as a central processing unit (CPU), a storage, such as a lookup table 927, e.g., an array, an external device interface 926, e.g., an optional universal serial bus port and related processing, and/or an Ethernet port and related processing, an output device interface 923, a receiver, e.g., antenna 930, and an optional user interface 929, e.g., an array of status lights and one or more toggle switches, and/or a display, and/or a keyboard and/or a pointer-mouse system and/or a touch screen. Optionally, the computing device may comprise an addressable memory where the addressable memory may, for example, be: flash memory, eprom, and/or a disk drive or other hard drive. These elements may be in communication with one another via a data bus 928, via an operating system 925 such as a real-time operating system and/or an operating system, supporting a web browser and applications, the processor 924 may be configured to execute steps of a process, e.g., executing a rule set, according to the exemplary embodiments described above.

Figure 10:
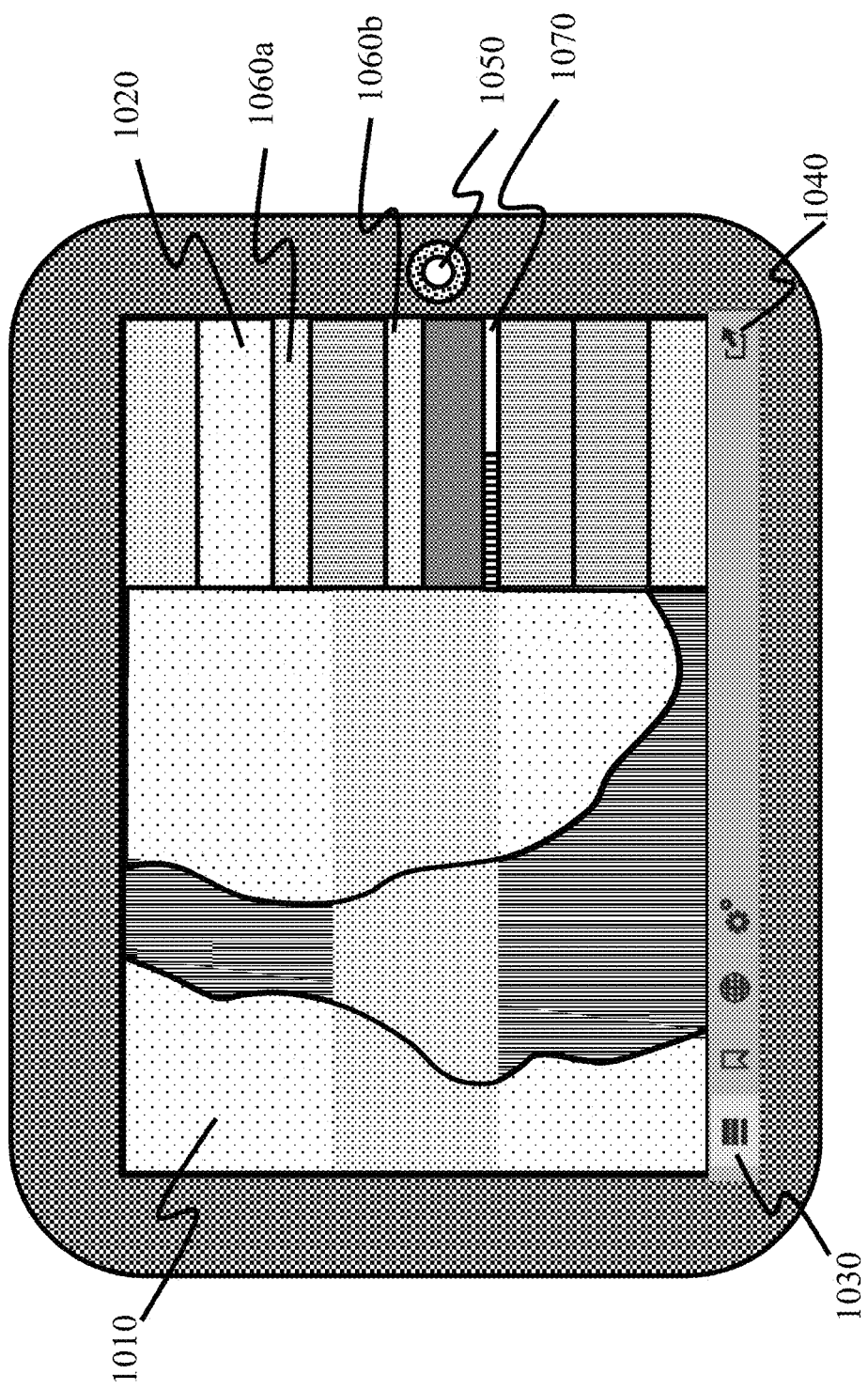
FIG. 10 depicts a scenario where the provided background image may vary dynamically based on the user's place in the story.

FIG. 10 depicts a scenario where the provided background image 1010 may vary dynamically based on the user's place in the story. In one embodiment, the image may correspond to a significant event that recently occurred in the story, in another embodiment it may be an image captured substantially contemporaneously with the discontinuation of the playing of the content. The grid chapter tiles 1020 may optionally include images representing chapters. These chapter tiles 1020 are shown in a line at the right edge of the screen, however the placement need not be in this location. The images on the grid chapter tiles 1020 change states depending on the user's progress through the chapters. In one embodiment, progress may be measured using a proxy, usually including content display, where it may be assumed that if the content was displayed, that the user viewed the content and has thus progressed. In one embodiment, the device itself may use a camera 1050 or other device to identify the user and determine if the user is actually looking at the display. In this embodiment, the user's progress may be more closely aligned with demonstrated viewing.

In one embodiment, the grid chapter tiles 1020 are black and white chapter thumbnails representing chapters the user has already watched or have been played. Images for these grid chapter tiles 1020 may include "spoiler" images that reference key parts of the chapter. In one embodiment, a full color grid chapter tile 1020 may be used to identify the next chapter that the user has not yet watched. In one embodiment, only grid chapter tile 1020 can be displayed as full-color. That is, a user must watch all previous chapters first in order to unlock the chapter. In another embodiment, the next unwatched grid chapter tile may include dynamic video. The dynamic video may be carefully selected for the purpose of enticing a viewer or may be selected automatically passed on position in the chapter, based on color scheme, based on recognizable content or other factor. In one embodiment, color tinted grid chapter tiles 1020 are not yet available. The tint color may be selected as part of the content theme, for example, red for horror. In one embodiment, these chapters may not be available because the user has not yet watched all previous chapters; the chapter has not been released yet; or for other reasons.

In one embodiment, grid chapter tiles 1020 are visible on the grid until ten (10) days after the user has watched the last chapter. The number of grid chapter tiles visible may be customized based on the size of the screen that the user is using. In addition, newer chapters may be added and in doing so, replace older chapters.

In one embodiment, an application navigation menu bar 1030 all screens, with the exception of the video player, belong to a dedicated section of the application. The current section is represented on the navigation menu as being "pressed in" or otherwise indicated as being active. In one embodiment, the "Grid" is the default screen of the application. It is on this screen where users can purchase, download, and launch chapters. In one embodiment, virtual marks, e.g., bookmarks, may be added to the streaming content. These "bookmarks" are user-created saved timestamps from chapters. In one embodiment, there is community feature on the navigation menu 1030. This component may provide access to a plurality of social media sites and options, for example, Facebook®, Twitter®, YouTube®, Quora®, Tumblr®, and Pinterest® pages. One embodiment may also include a settings area where a user may manage media, including purchase, download, archive chapters, view help FAQ, and view about page. In addition, a global share component 1040 may open an iOS share menu.

In one embodiment, fragment thumbnail 1060a and 1060b animate in behind the grid chapter tiles 1020 thumbnail images, shifting the grid chapter tiles 1020 grid down. Activating or selecting the fragment thumbnail 1060a, 1060b will open the associated fragment content. In one embodiment, the fragment may play media content. In one embodiment, the user may download chapters. In some embodiments, the download progress bar 1070 appears immediately after the user indicates, by an overt act, a desire to purchase. In another embodiment, a user may select "Buy" on a purchase alert or "Download" on a Chapter Lightbox. In one embodiment, the download button appears even though the content is already in a local memory, giving the illusion to the user that the system is actually downloading the content.

Figure 11:
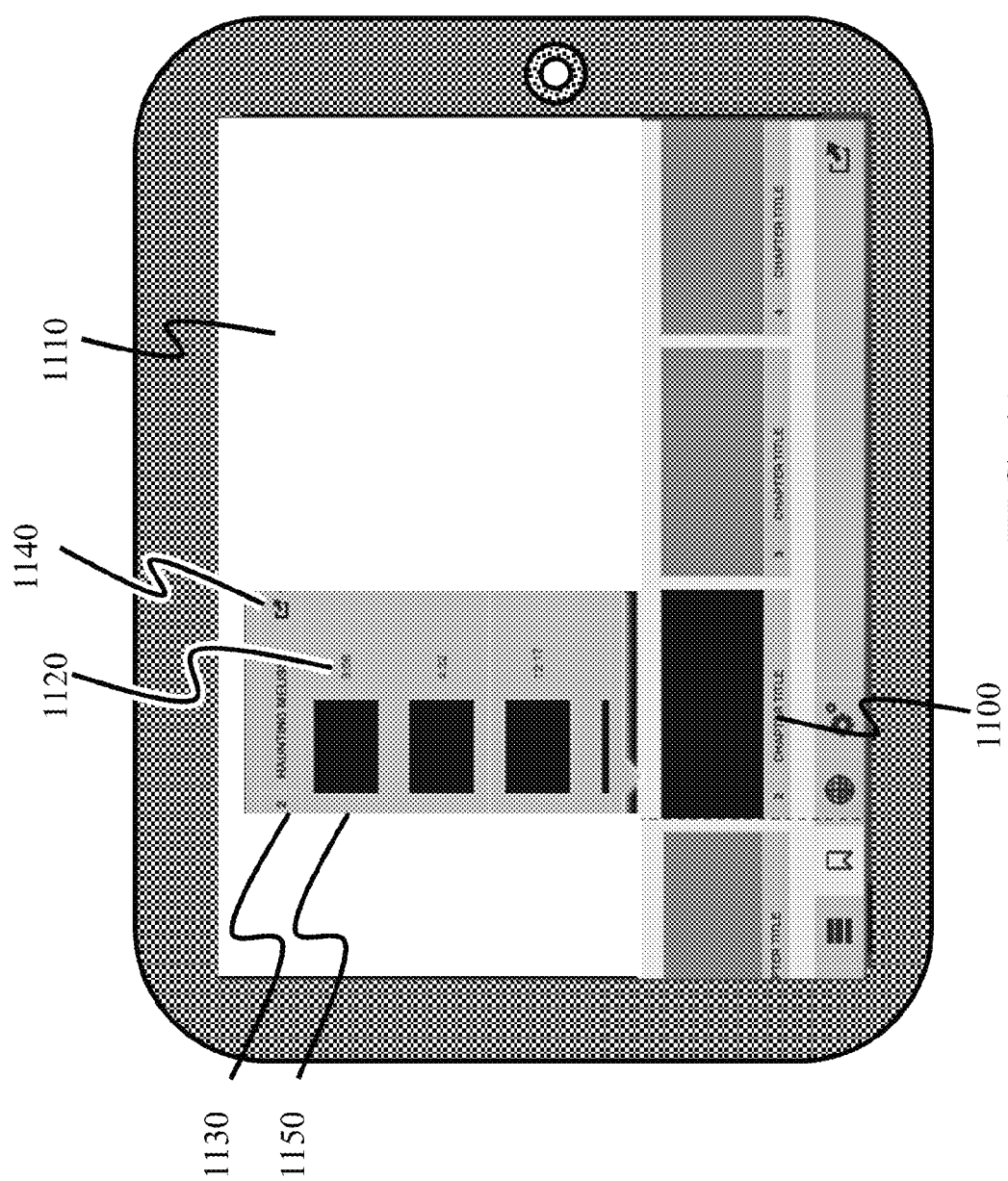
FIG. 11 depicts an embodiment where a plurality of content components are displayed on a display screen.

In another embodiment, as shown in FIG. 11, a plurality of content components, in this case chapters 1100, are displayed on a display screen 1110. In one embodiment, selecting a chapter 1100 may "left-align" the chapter 1100 a predetermined distance from the left edge at the screen 1110 and open the chapter bookmarks menu 1120. In one embodiment, the chapter number and title 1130 may be visible and allow the user to see both number and title. In some embodiments, only the title or chapter may be visible. The user added bookmarks are both relevant and important in discussing and sharing the media. As such user added bookmarks may be shared 1140 by selecting a share option. Optionally, this may be done using a tactile responsive component or other means. A bookmark row 1150 may display a key-frame image and time-stamp of the bookmark. If the selected chapter is downloaded, selecting the row may, in this embodiment may open the full-screen video player and jump to the saved time-marker in the chapter. From time to time the chapter may not be available, possibly because it has not been downloaded, or it has been archived. By selecting a row, the user may be queried if the chapter should be downloaded. In other embodiments the chapter may be downloaded automatically. In another embodiment a user may comment regarding content in real time while watching the content. The comments may be stored for display later on a peer or other system or shared in real time.

Figure 12A:
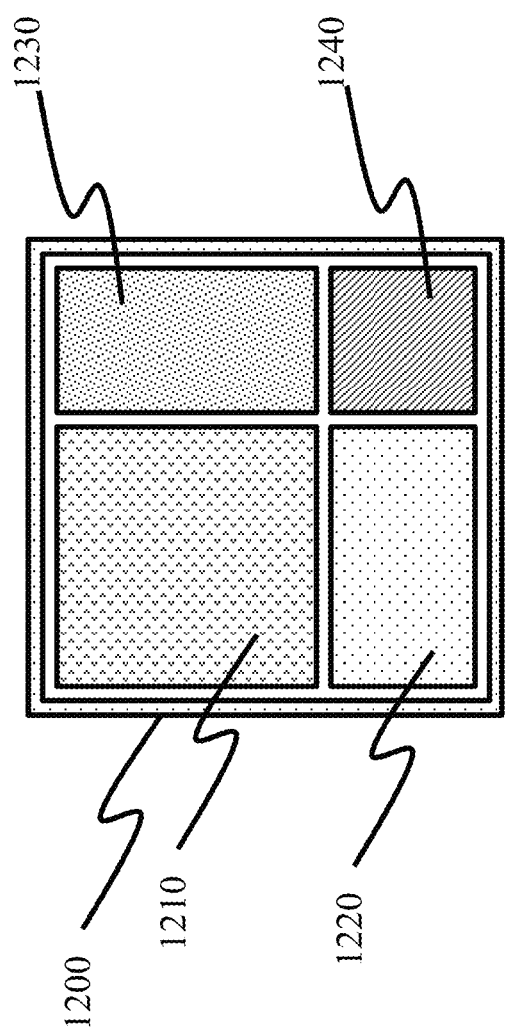
FIG. 12A shows an embodiment where content may generally be downloaded in a multi-file chapter.
Figure 12B:
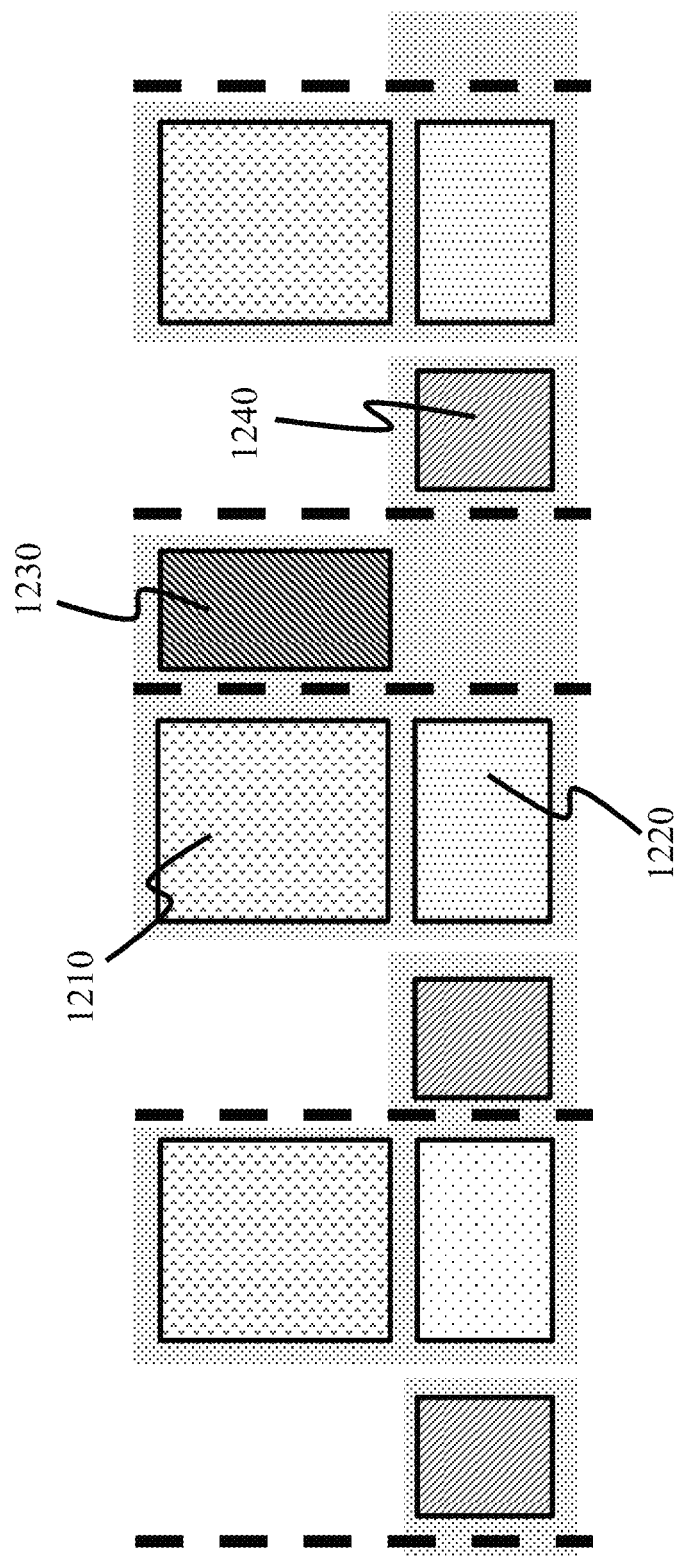
FIG. 12B shows the multi-file chapter separated into constituent parts.

FIG. 12A, shows an embodiment where content may generally be downloaded in a multi-file chapter 1200. In this embodiment, downloading a chapter 1200 may include up to four files, namely the chapter 1210, the Chapter Branch 1220, an immediately following fragment 1230, and a teaser for the next chapter 1240. In one embodiment, the chapter 1200 may be separated into constituent parts, as illustrated in FIG. 12B. It should be noted that not in every case will each chapter include four files; the aforementioned example is for the purposes of illustration only. In addition, in some embodiments the number of files in a chapter may change with time. That is, by way of non-limiting example, the initial chapter 1200 may have four files but at a subsequent time it may have five or more files. In addition, the contents of the files may change as a function of time, user behavior, demonstrated predilections, or stated preferences. Changes may be done by individual, self-selected group, membership in a peer group, geographic region, or other factor.

FIG. 13 depicts an embodiment that allows for archiving of media. This may include one or more chapters. In practice a user may select to archive a chapter 1300a or fragment 1310. When chapters or fragments are archived, the chapter, branch, and teaser for that chapter are removed from the user's device and sent to an archive 1320. In this way memory space may be freed on the user's system 1330. In one embodiment, the media is shown to be archived but in reality is deleted while the user's bookmarks and annotations are archived. At a future time a user may wish to re-download the media. The user may re-download a chapter or fragment that has been archived. In this instance, the chapter, branch, and teaser 1300b for that chapter are re-downloaded from the archive 1320.

Another embodiment of the present invention may include a device, comprising a visual display interface configured to support emitting electromagnetic radiation and an auditory interface configured to support emitting and receiving electromechanical waves of frequencies less than approximately 20,000 Hz. In another embodiment, the device may include a query component that is configured to capture a user input and record a response. This might be an invitation to share comments, to share activity, to purchase additional content, or to create content which then may be shared or kept.

In another embodiment the device may be configured to use a set of responses to extract information from the operation of the computing device and, via the interface, transmit the information to a remote data repository and where the remote data repository may be access controlled. The remote data repository may be a social networking site, a financial site, a feedback site, or other repository not necessarily associated with the internet.

In one embodiment, the auditory interface of the device may include a component that may be configured to emit electromechanical waves at frequencies between approximately 0.1 Hz and 5 Hz. Infrasound, or sound at less than 20 Hz is specifically contemplated. Specifically, infrasound below 5 Hz and more specifically below 1 Hz is contemplated in one embodiment. In an exemplary embodiment, frequencies of under 1 Hz are contemplated. These lower frequencies, while not generally audible to humans, may be nonetheless perceptible and may be used to create excitement or fear in some people.

In another embodiment an electromagnetic radiation transceiver may be configured to transmit and receive electromagnetic radiation. The device may include a user interface comprising at least one of a tactile responsive component, an electromechanical radiation responsive component, and an electromagnetic radiation responsive component. In addition, the device may include a processor, a memory component, a time measuring component, and an access control controller. It should be noted that some or all of the components may not be physically resident on the device but rather that the device may have the ability to utilize the components. The user interface may be configured to receive a set of instructions via the user interface and transmit the set of instructions to the processor. In one embodiment, the electromagnetic radiation transceiver may be configured to receive partitioned media content. In one embodiment, the transceiver may be configured to send the partitioned media content to the memory component and the memory component may be configured to store the partitioned media content. The access control controller regulates access to at least a portion of the partitioned media content and the access control controller may include a function limiter configured to disable at least a portion of the user interface during the occurrence of specified events.

Another embodiment may further include a position determining component as described elsewhere herein. An embodiment may include an instruction creating component, including a user interface sensor, where the instruction creating component may be configured to identify and record select predefined activity occurring at the user interface. This may include sharing insights on content, sharing, authorizing purchase of content or other activity. A communication interface sensor may be provided and be configured to identify and record input from the communication interface. In one embodiment, receiver configured to receive input from at least one of a time measurement component or position determining components and the access control controller controls access to at least a portion of all delivered partitioned media. The access control controller may include a timer and may be configured to prevent access to portions of the partitioned media content until a predetermined amount of time has elapsed since the content was displayed in its entirety.

In another embodiment, the device processor may be further configured to store a set of instructions until a triggering event may occur. A triggering event may include the device identifying a wireless network, the device interfacing with an internet connection, the device coming in contact with another component capable of receiving and retransmitting signals from the device to a desired location.

In another embodiment, the device may be configured to start displaying the partitioned media content as soon as sufficient partitioned media content is present on the device. In another embodiment, the user interface may be configured to allow a user to create content associated with the partitioned media content and the content may be stored in the memory component. Optionally, the memory component need not be resident on the device. By extension, the user created content associated with the partitioned media content need not be stored on the resident memory. A shortcut however may create the illusion that the content resides on the device.

The user interface on the device may be configured to display predetermined changes to the access control controller. These changes may be made by the creator of the media, and the impetus to send the changes may generated based on activity level of a user as detected at the user interface. By activity level it is understood that inactivity is subsumed within the term. Thus, a period of inactivity may prompt a notice to be sent indicating that additional content is now available or has been unlocked.

In another embodiment, the device is configured to store specific instructions and transmit the specific instructions when the electromagnetic transceiver establishes a link to a distributed database. This could be the case of a person ordering additional media content. Even though an internet connection is not established at the time the device may put the order into a queue and when the connection is re-established. Ordering instructions are not the exclusive content that could be queued, user created content and other data may be queued.

Another embodiment of the invention may include a method comprising the steps of receiving, by a user interface of a first computing device having a processor and addressable memory, a set of instructions via a user interface. Transmitting the received set of instructions to the processor, receiving by a communication interface media content and storing, by the computing device, the received media content to the addressable memory. The method includes the step of displaying, by a display interface, at least a portion of the media content and disabling, by an access control controller, at least a portion of the user interface. The disabled portion may be the fast forward function. The access control controller is configured to control access to additional media content based input from the user interface, input from the communication interface, or a set of instructions from the addressable memory. The access control controller may render at least a portion of the media content unavailable based on a set of instructions received from the processor. Normally this would be a time period between episodes but many other criteria would also control. The method includes storing, by the processor, a set of instructions until at least a determinable event occurs. Examples of such events include the computing device identifying a wireless network, interfacing with an internet connection, or a computing device coming in contact with another component capable of receiving and retransmitting signals from the computing device.

Dynamic Story Elements (DSE)

Figure 15:
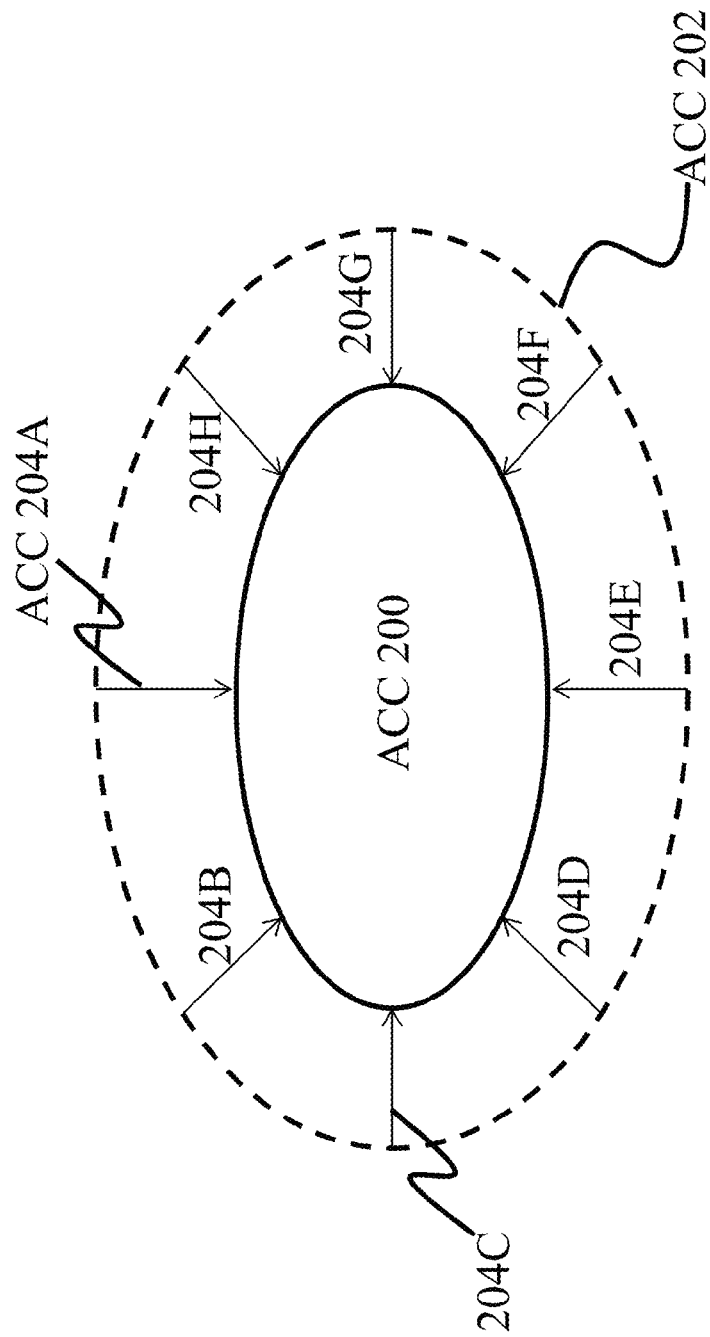
FIG. 15 depicts a system for ascertaining user preferences using an automated cue collector.

Dynamic Story Elements are content within a media presentation. Unlike normal media presentations the addition of dynamic Story Elements results in a viewing experience which may be unique based on random events or detected user behavior. By way of non-limiting example, FIG. 14 provides a basic storyline 1400 where the x-axis represents time and the y-axis represents content. The line 1400 represents the storyline. Perturbations 1402A and 1402B, 1404, and 1406 are latent in the basic storyline 1400. An unrecognized user viewing the story for the first time may see only the basic storyline 1400. In one embodiment, with time, the system depicted in FIG. 15 will ascertain user preferences using an automated cue collector 204. The automatic cue collector 204 relies on a plurality of inputs 204A-H including user behavior as captured by explicit user input, by way of non-limiting example a user may opt to limit certain language, for instance racial slurs, profanity, or sexual innuendo. Similarly, the user may opt to limit or exclude graphic violence, nudity, sexual behavior, or certain type of sexual behavior. This could be done using a menu choice where drop-down choices allow for specific explicit instructions or a bank of user taste preferences gleaned from a test where a user can provide as much or as little information about themselves as they desire. In one embodiment, the test results and preferences are stored only on the user's system. Thus, privacy choices would be respected, while simultaneously allowing a user to customize the viewing experience. In another embodiment, an image capture device on the user system may be used to capture involuntary user responses such as widening of the eyes, closing of the eyes, opening the mouth. A microphone similarly could capture voice, or screams. In another embodiment, the media content dialog may be extracted or filtered out. In that embodiment, users may be rewarded for sharing preferences in content. In another embodiment data may be collected centrally but would be combined with input from other users so as to make the data substantively anonymous. Accordingly, the input from ten users would be combined and provided to a central database. The user privacy rights are respected but the user still may shape content with a high degree of granularity. Of course, the number of users could be significantly higher or lower. Two or more users may be required in order to create some level of anonymity; the greater the number of users in the sample, the less granularity and consequently the customized viewing experience may thereby be reduced.

The Automatic Cue Collector may collect input including: user location, viewing time, such as morning, evening, night, late night, after midnight but before dawn. The dynamic story elements may be resident on the system or drawn from a distributed database, such as a cloud-based database. The user location may be augmented with knowledge of the nature of the location to make additional inferences about the user. Knowing the nature of a business located at a geographical location may provide insight on income level, occupation or occupation type, and many other factors.

User preference recognizes a viewer's desires to control certain characteristics of content within a larger presentation. In this sense, some viewers may opt for more graphic content while other may opt for less graphic content. That is, a baseline story may include scenes that deviate from the up (more graphic) or down (less graphic). Similarly, with respect to language, choice of weapons, sources of fear (an oncoming truck versus an unseen object with lights).

In one embodiment, the user may have indicated, either through behavior or explicit instructions, a lower tolerance for graphic violence, and a higher tolerance for explicit dialog. Referring again to FIG. 14, the user would follow the normal storyline, at position 1401 the storyline may include an element with graphic violence. The user preference may now control shifting the storyline toward storyline path 1402A which may include, in one embodiment, a post production "silhouette" that may serve as the less graphic version. Alternatively, it may be a second take which is less graphic. Conversely, if the user indicated a preference for graphic violence, the scene may be made more graphic as by showing blood, adding audio content, or otherwise altering the content to make it more graphic. In these embodiments the parallel story line is not a deletion but rather a parallel story line with content that preserves the storyline 1400 timeline but alters the content. It is know that audio content can materially change the user perceptions of content, thus it may specifically be contemplated that in some cases the audio may be the sole component altering the storyline 1400. This may be by changing dialog based on preferences or changing mood sounds to make a scene or portion of a scene more or less terrifying, or altering the dialog to alter linguistic content (optionally driven by input from the automatic cue collector 200). It may also be specifically contemplated that linguistic content coupled with visual content may preserve a theme throughout the media presentation. By way of non-limiting example, a first version of the storyline 1400 may revolve around a murder. The more graphic version of the storyline 102B may make it, for example, a gruesome beheading while the normal storyline 1400 has it simply as a non-graphic homicide. In the non-graphic version of the story 102A it may be a bloody shirt, or even a dead dog, or other seemingly non-parallel story component. In the latter case storyline 1400 may be careful to avoid reference to the victim being a human. Thus two viewers could watch the same program, but because of expressed taste preferences and dynamic story elements enjoy a program which will closely approximate user preferences. This system allows users to customize content to a degree of granularity never before possible. Thus, through the automatic cue collector 200, it is possible for a user to customize media content to a very high level. In some embodiments the automatic cue collector 200 may rely on viewing history tied to the users viewing habits as recorded by Internet browsing history, and recording viewing preferences. In some cases, non-explicit choices and explicit choices may be waited according to significance scores, and the scores may be weighted in favor of implicit behavior as opposed to explicit statements. In another embodiment, a user may be confronted with the apparent dichotomy and asked to clarify their position.

Dynamic Story Schedule (DSS)

A Dynamic Story Schedule, at the core, is the schedule that allows for the story to be viewed on a schedule. The schedule may be altered dynamically based on user behavior. That is, a user who is observed to only watch for twenty (20) minutes at a time may have the duration of his episodes limited to twenty (20) minutes.

The duration of content, just like the content itself may be customized to user preferences. Some users may tolerate a 40 minute presentation while other users may only consistently view a fraction of that period. The automatic cue capture 200 component will record the preferred view duration and customize content delivery to closely capture the view duration. The duration may be customized to the length of a commute, that is, the automatic cue collector discovers, based on GPS data that the user views content for approximately 40 minutes while traveling on a railway track. The system would thus create content components of a length suitable for the commute. Likewise content duration may be altered based on days, that is, weekend evenings may have longer episodes than weekday commutes. In other embodiments the content may be made available in time for an anticipated viewing schedule. That is, content may be unlocked in anticipation of an evening commute. In addition, content may be made available based on a disclosed schedule that includes a waiting component. That is, every Friday a user needs an oil change. In light of this disclosed activity (getting an oil change) and the sensed presence at a service station (based on a GPS/terrestrial sensed position), content may be released, but on a Friday where the position sensor shows the user at home a different duration media portion may be made available or it may be that no content is made available unless the user leaves home.

Both the DSE and DSS can be pushed from a central database to a node or the entire protocol may be resident on a node itself. In the latter case the entire learning process may be limited to the user's unique conduct being learned on the node itself and the content may be delivered to the user using the DSE and DSS features which are fully self-contained on the node.

Together, the DSS and DSE rely on a plurality of tools to recognize and capture user behavior. Some exemplary tools include: the keyboard interface, explicit instructions, and inferred preferences. Explicit instructions may take the form of self-reporting of preferences, user stated available times, and other characteristics identified by the user, and optionally validated by observation. Inferred preferences may be deduced from actual practice, and input from cameras, microphones and physiological sensors such as cameras, respiration meters, heart-rate measurements, blood pressure, and changes in pupil size not ascribable to changes in ambient light or screen illumination. A baseline may be established when predictable footage is displayed, as to normal variations based on changes in illumination intensity emanating from the media source or other location and gaze aversion.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

What is claimed is:

1. A device comprising:
a visual display interface configured to support emitting electromagnetic radiation between approximately 400-700 nm;
an auditory interface configured to support emitting electromechanical waves of frequencies between approximately 20-20,000 Hz;
an electromagnetic radiation transceiver configured to transmit and receive electromagnetic radiation;
a user interface comprising at least one of:
a tactile responsive component;
an electromechanical radiation responsive component; and
an electromagnetic radiation responsive component;
a processor;
an addressable memory component;
a time measuring device; and
an access control controller;
wherein the user interface is configured to:
receive a set of instructions via the user interface and transmit the received set of instructions to the processor;
wherein the electromagnetic radiation transceiver is further configured to:
receive partitioned media content; and
the electromagnetic radiation transceiver is configured to send the partitioned media content to the addressable memory component;
wherein the addressable memory component is configured to store the partitioned media content for at least some period of time;
wherein the access control controller regulates access to at least a portion of the received partitioned media content and the access control controller comprises at least one of:
a function limiter configured to disable at least a portion of the user interface during an occurrence of specified events, the function limiter including at least one of:
a position determining component comprising at least one of:
a terrestrially based position determining component;
a satellite based position determining component; and
a hybrid of terrestrially and satellite based position determining devices; and
an instruction creating component comprising at least one of:
a user interface sensor configured to identify and record select predefined activity occurring at the user interface;
a communication interface sensor configured to identify and record input from a communication interface; and
a receiver configured to receive input from at least one of a time measurement component or position determining component; and
wherein the access control controller controls access to at least a portion of all delivered partitioned media content using a combination of instructions from the user interface and other controls.

2. The device of claim 1 wherein the partitioned media content is delivered to the device responsive to an input from the tactile responsive component.

3. The device of claim 1 wherein the user interface is further configured to include a plurality of panels, wherein the plurality of panels comprise a plurality of states, and wherein the plurality of states correspond to at least one of: an availability of the partitioned media content; a location of the partitioned media content, a portion of the partitioned media content, and a description of the partitioned media content.

4. The device of claim 3 wherein at a point in time, the plurality of panels on the user interface is substantially constant but the content of the panels is changed by at least one of a content provider or the user interface.

5. The device of claim 3 further comprising a query component, wherein the query component is configured to capture a user input and record a response.

6. The device of claim 5 wherein a set of responses extract information from the operation of the device and, via the communication interface, transmit the information to a remote data repository.

7. The device of claim 6 wherein the set of responses is from the user and prompts the processor to extract information concerning the operation of the device via the user interface and transmit the information to a remote data repository, wherein the remote data repository is access controlled.

8. The device of claim 1 wherein a portion of the partitioned media content is temporarily removed from the device based on input from a user, and wherein input from the user can add substantially identical content back to the device.

9. The device of claim 1 wherein the function limiter is further configured to disable the ability to accelerate the rate of media display on an initial displaying.

10. The device of claim 1 wherein the position determining component is a camera interfaced with the device and the device is configured to recognize an image provided by the camera.

11. The device of claim 10 wherein the image provided by the camera is a man-made image selected from: a barcode; a quick response code; and a high contrast two dimensional image; and wherein the man-made image is located at a known location.

12. The device of claim 1 wherein the partitioned media content is delivered to the device based on a response to an input from the tactile responsive component.

13. The device of claim 12 wherein at least a portion of the partitioned media content is delivered at approximately the same time it is displayed.

14. The system of claim 13 wherein the addressable memory component is configured to temporarily store the partitioned media content.

15. The device of claim 1 wherein the partitioned media content is configured to include a plurality of partitioned media contents and the plurality of partitioned media contents are made available at different times and such times are not controlled by the user.

16. The device of claim 1 wherein the partitioned media content is configured to be made available based on a disclosed schedule comprising a waiting component.

17. The device of claim 1 wherein the at least a portion of all delivered partitioned media content is received via a push mechanism from a central database.

18. The device of claim 17 wherein the access control controller controls access to the at least a portion of all delivered partitioned media content received from a central database.

19. The device of claim 1 wherein the electromagnetic radiation transceiver is further configured to receive additional media content after the access control controller has given access to previously received partitioned media content.

* * * * *